United States Patent
Mashitani et al.

(10) Patent No.: US 12,148,331 B2
(45) Date of Patent: Nov. 19, 2024

(54) CONTENT GENERATION METHOD, CONTENT PROJECTION METHOD, PROGRAM, AND CONTENT GENERATION SYSTEM

(71) Applicant: Panasonic Intellectual Property Management Co., Ltd., Osaka (JP)

(72) Inventors: Ken Mashitani, Osaka (JP); Junji Masumoto, Kanagawa (JP); Takaaki Abe, Osaka (JP); Akio Yamanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/323,996

(22) Filed: May 18, 2021

(65) Prior Publication Data

US 2021/0366324 A1    Nov. 25, 2021

(30) Foreign Application Priority Data

May 19, 2020 (JP) .................................. 2020-087727
Apr. 20, 2021 (JP) .................................. 2021-070748

(51) Int. Cl.
   *G09G 3/00* (2006.01)
(52) U.S. Cl.
   CPC ..... *G09G 3/001* (2013.01); *G09G 2340/0464* (2013.01); *G09G 2340/0492* (2013.01); *G09G 2354/00* (2013.01)

(58) Field of Classification Search
   CPC .......... G09G 3/001; G09G 2340/0464; G09G 2340/0492; G09G 2354/00
   See application file for complete search history.

(56) References Cited

U.S. PATENT DOCUMENTS

| | | | |
|---|---|---|---|
| 6,744,565 B1* | 6/2004 | Kashitani | F16M 11/10 348/36 |
| 10,194,144 B2* | 1/2019 | Sugiura | H04N 5/74 |
| 2012/0249741 A1* | 10/2012 | Maciocci | G06T 15/503 348/46 |

(Continued)

FOREIGN PATENT DOCUMENTS

| | | |
|---|---|---|
| JP | H09-149296 A | 6/1997 |
| JP | 2001-069380 A | 3/2001 |

(Continued)

*Primary Examiner* — Samantha (Yuehan) Wang
(74) *Attorney, Agent, or Firm* — Rimon P.C.

(57) ABSTRACT

A content generation method generates image content to be projected at a projection position in a real space by a projector. In a first acquisition process, space information regarding a virtual space corresponding to the real space is acquired. In a second acquisition process, display position information regarding a display position corresponding to the projection position in the virtual space is acquired. In a third acquisition process, reference position information regarding a reference position in the virtual space is acquired. In a generation process, an image including an object viewed from the reference position when the object is displayed at the display position in the virtual space is generated as the image content, based on the space information, the reference position information, and the display position information.

15 Claims, 12 Drawing Sheets

(56) References Cited

U.S. PATENT DOCUMENTS

| | | | |
|---|---|---|---|
| 2016/0371884 A1* | 12/2016 | Benko | G02B 27/017 |
| 2018/0014008 A1 | 1/2018 | Sugiura | |
| 2020/0042077 A1* | 2/2020 | Hiroi | G06T 19/006 |
| 2020/0368625 A1* | 11/2020 | Iwata | A63F 13/53 |
| 2021/0302753 A1 | 9/2021 | Suzuki | |

FOREIGN PATENT DOCUMENTS

| | | |
|---|---|---|
| JP | 2001-320652 A | 11/2001 |
| JP | 2015-198275 A | 11/2015 |
| JP | 2016-081497 A | 5/2016 |
| JP | 2018-005115 A | 1/2018 |
| KR | 10-2019-067070 A | 6/2019 |
| WO | 2020/031740 A1 | 2/2020 |

\* cited by examiner

FIG. 4
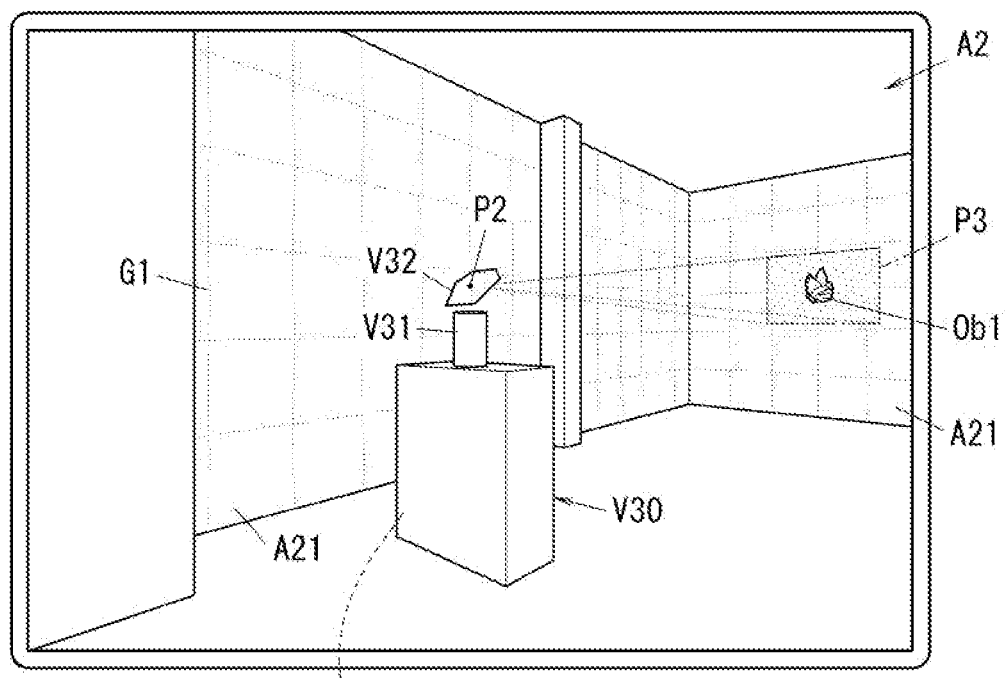
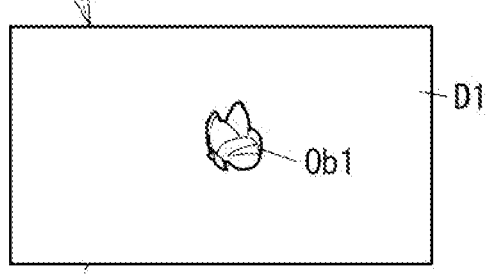
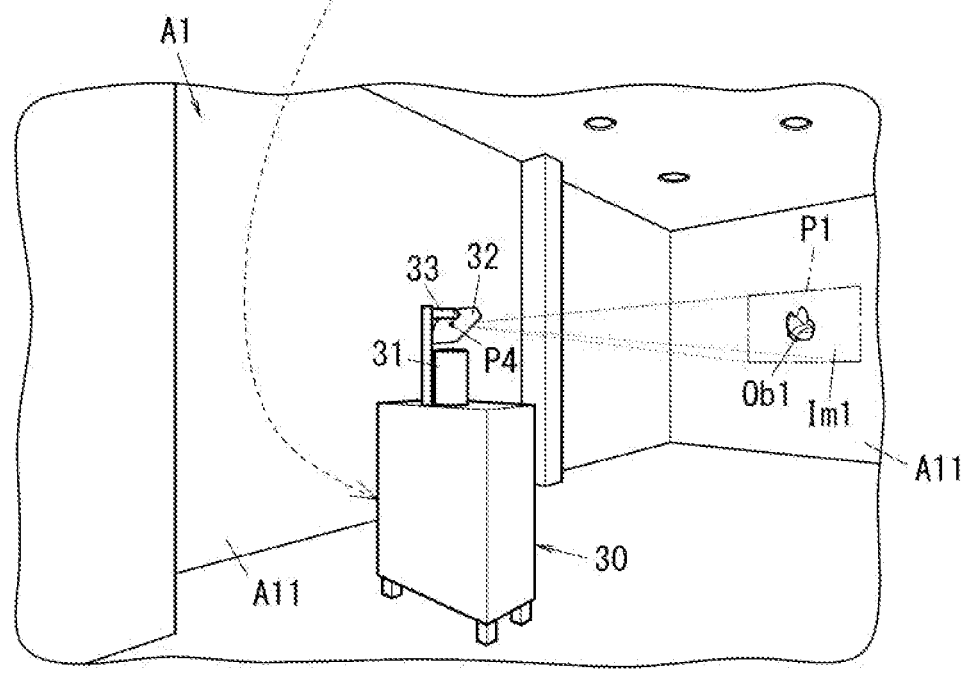

CONTENT GENERATION METHOD, CONTENT PROJECTION METHOD, PROGRAM, AND CONTENT GENERATION SYSTEM

BACKGROUND

1. Technical Field

The present disclosure generally relates to a content generation method, a content projection method, a program, and a content generation system. More specifically, the present disclosure relates to a content generation method, a content projection method, a program, and a content generation system for generating image content to be projected at a projection position in a real space by a projector.

2. Description of the Related Art

PTL 1 (Unexamined Japanese Patent Publication No. 2016-81497) discloses an image display system in which a projector means projects an image in a display area of projection mapping. In the image display system described in PTL 1, the projector means projects one image in the image display area, and projects the image in the image display area to follow a movement operation of the image display area.

That is, in PTL 1, the image display area can be moved, rotated, and turned in any direction, and the projector (projector means) can also be moved and displaced in any direction. Then, in the image display system, when the image display area moves, motion of the image display area is detected, and a projection position where the image is projected in the real space is changed by moving the projector so as to follow the movement operation of the image display area.

SUMMARY

For example, a projection image becomes larger as a projection distance becomes longer. Therefore, for making a size of an object in the projection image constant, it is necessary to determine the size of the object in the image content in accordance with a relative positional relationship between a projector and a projection position (image display area). In particular, when the projection position changes as described above, the relative positional relationship between the projector and the projection position changes. This requires time and effort to generate image content according to the positional relationship between the two.

The present disclosure has been made in view of the above circumstances, and an object is to provide a content generation method, a content projection method, a program, and a content generation system that enable easier generation of image content.

A content generation method according to one aspect of the present disclosure is a method for generating image content to be projected at a projection position in a real space by a projector, and includes a first acquisition process, a second acquisition process, a third acquisition process, and a generation process. In the first acquisition process, space information regarding a virtual space corresponding to the real space is acquired. In the second acquisition process, display position information regarding a display position corresponding to the projection position in the virtual space is acquired. In the third acquisition process, reference position information regarding a reference position in the virtual space is acquired. In the generation process, based on the space information, the reference position information, and the display position information, an image including an object viewed from the reference position when the object is displayed at the display position in the virtual space is generated as the image content.

A content projection method according to one aspect of the present disclosure includes a projection process of projecting the image content generated by the content generation method at the projection position in the real space by the projector.

A program according to one aspect of the present disclosure is a program for causing one or more processors to execute the content generation method.

A content generation system according to one aspect of the present disclosure is a system for generating image content to be projected at a projection position in a real space by a projector, and includes a first acquisition unit, a second acquisition unit, a third acquisition unit, and a generation unit. The first acquisition unit acquires space information regarding a virtual space corresponding to the real space. The second acquisition unit acquires display position information regarding a display position corresponding to the projection position in the virtual space. The third acquisition unit acquires reference position information regarding a reference position in the virtual space. Based on the space information, the reference position information, and the display position information, the generation unit generates, as the image content, an image including an object viewed from the reference position when the object is displayed at the display position in the virtual space.

According to the present disclosure, there is an advantage that image content can be generated more easily.

BRIEF DESCRIPTION OF THE DRAWINGS

FIG. 4 is an explanatory view illustrating a state in which image content is generated by the content generation method described above and is projected by a projector;

DETAILED DESCRIPTION

First Exemplary Embodiment (1) Overview

Figure 1:
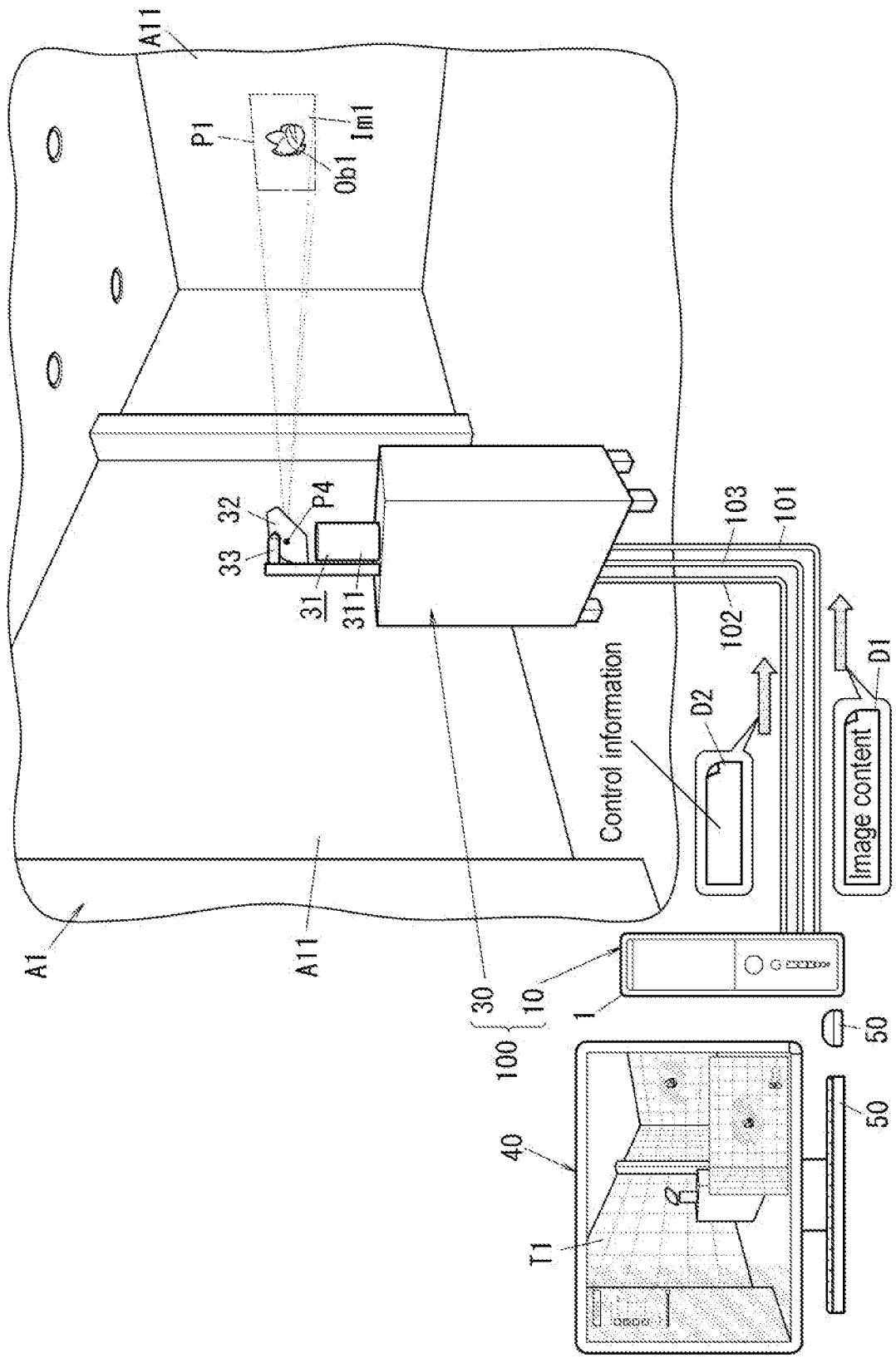
FIG. 1 is a schematic configuration view illustrating an image projection system according to a first exemplary embodiment.

Hereinafter, an overview of a content generation method, a content projection method, a program, and content generation system 10 according to the present exemplary embodiment will be described with reference to FIG. 1.

The content generation method according to the present exemplary embodiment is a method for generating image content D1 to be projected at projection position P1 in real space A1 by projector 30. Projector 30 uses image content D1 to project projection image Im1 at projection position P1 of projection surface A11, for example, by irradiating, with light, projection surface A11 such as a wall surface, a floor surface, or a ceiling surface existing in real space A1.

The "image content" in the present disclosure means contents of information (data) for forming an image to be projected by projector 30 as projection image Im1. That is, when image content D1 is inputted to projector 30, projector 30 can use image content D1 to project projection image Im1. In other words, the contents of projection image Im1 are determined by image content D1. Projection image Im1 may be subjected to processing such as trimming, brightness adjustment, or contrast adjustment on image content D1.

Here, when projector 30 projects projection image Im1, a size and a shape of projection image Im1 are changed depending on a relative positional relationship between projector 30 and projection position P1. Therefore, for example, in order to make a size and a shape of object Ob1 in projection image Im1 constant, it is necessary to determine the size and the shape of object Ob1 in image content D1 in accordance with the relative positional relationship between projector 30 and projection position P1. As an example, when a throw ratio is constant and a projection distance from projector 30 to projection position P1 is increased, projection image Im1 becomes large. In this case, in order to make the size of object Ob1 in projection image Im1 constant, it is necessary to reduce the size of projection image Im1 itself for reducing the size of object Ob1 in image content D1.

As described above, when image content D1 to be projected by projector 30 is generated, it is necessary to consider a relative positional relationship between projector 30 and projection position P1. This requires more time and effort than generation of image content to be displayed on a display that is not a projection type. In particular, for example, in a case where projection position P1 changes at any time in real space A1, the relative positional relationship between projector 30 and projection position P1 changes. Therefore, it takes much time and effort to generate image content D1 in consideration of the positional relationship between the two. The content generation method according to the present exemplary embodiment makes it possible to more easily generate image content D1 according to the relative positional relationship between projector 30 and projection position P1 by the following aspect.

That is, the content generation method according to the present exemplary embodiment is a method for generating image content D1 to be projected at projection position P1 in real space A1 by projector 30, and includes a first acquisition process, a second acquisition process, a third acquisition process, and a generation process. In the first acquisition process, space information is acquired. The space information is information regarding virtual space A2 (see FIG. 3A) corresponding to real space A1. In the second acquisition process, display position information is acquired. The display position information relates to display position P3 (see FIG. 3B) corresponding to projection position P1 in virtual space A2. In the third acquisition process, reference position information is acquired. The reference position information is information regarding reference position P2 (see FIG. 3C) in virtual space A2. In the generation process, based on the space information, the reference position information, and the display position information, an image including object Ob1 viewed from reference position P2 when object Ob1 is displayed at display position P3 in virtual space A2 is generated as image content D1.

According to this aspect, in virtual space A2 corresponding to real space A1, there is generated, as image content D1, an image including object Ob1 viewed from reference position P2 when object Ob1 is displayed at display position P3 corresponding to projection position P1 in real space A1. That is, in virtual space A2, object Ob1 can be virtually displayed in any size and shape at any display position P3. Then, for example, when image content D1 is projected at projection position P1 by projector 30 installed at a position corresponding to reference position P2 in real space A1, object Ob1 to be projected substantially coincides with object Ob1 virtually displayed at display position P3. Therefore, by displaying, at display position P3 in virtual space A2, object Ob1 desired to be projected at projection position P1 in real space A1, it is possible to generate image content D1 without considering a relative positional relationship between projector 30 and projection position P1. As a result, there is an advantage that it becomes easy to generate image content D1 according to the relative positional relationship between projector 30 and projection position P1, and it becomes possible to more easily generate image content D1.

Figure 2:
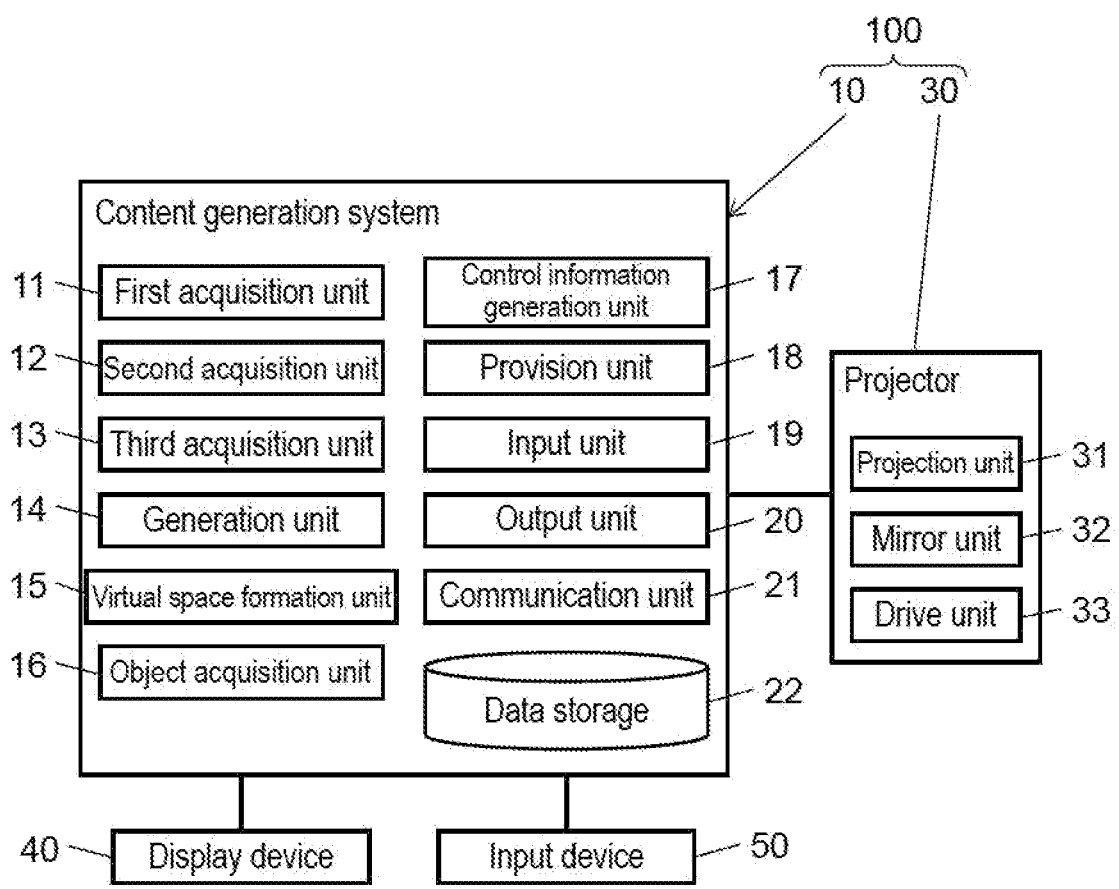
FIG. 2 is a schematic block diagram of the image projection system described above.

Furthermore, the content generation method according to the present exemplary embodiment is executed by content generation system 10 as illustrated in FIG. 2, as an example. In other words, content generation system 10 is one aspect for embodying the content generation method described above. Content generation system 10 according to the present exemplary embodiment is a system for generating image content D1 to be projected at projection position P1 in real space A1 by projector 30, and includes first acquisition unit 11, second acquisition unit 12, third acquisition unit 13, and generation unit 14. First acquisition unit 11 acquires space information. The space information is information regarding virtual space A2 corresponding to real space A1. Second acquisition unit 12 acquires display position information. The display position information relates to display position P3 corresponding to projection position P1 in virtual space A2. Third acquisition unit 13 acquires reference position information. The reference position information is information regarding reference position P2 in virtual space A2. Based on the space information, the reference position information, and the display position information, generation unit 14 generates, as image content D1, an image including object Ob1 viewed from reference position P2 when object Ob1 is displayed at display position P3 in virtual space A2.

Here, content generation system 10 according to the present exemplary embodiment includes, as a main configuration, a computer system having one or more processors and one or more memories. In other words, the content generation method according to the present exemplary embodiment is used on the computer system (content generation system 10). That is, the content generation method can also be embodied by a program. A program according to the present exemplary embodiment is a program for causing one or more processors to execute the content generation method according to the present exemplary embodiment.

Furthermore, the content projection method according to the present exemplary embodiment is a method for projecting projection image Im1 by using image content D1 generated by the content generation method described above. That is, the content projection method includes a projection process. In the projection process, image content D1 generated by the content generation method according to the present exemplary embodiment is projected at projection position P1 in real space A1 by projector 30.

(2) Premises

The "image" in the present disclosure includes a moving picture (moving image) and a still picture (still image). Further, the "moving picture" includes an image including a plurality of still pictures obtained by frame capturing or the like. Further, the "image" includes a monochrome image and a color image. In the present exemplary embodiment, as an example, the "image" is an image that changes with the lapse of time (that is, a moving picture), and is a full-color image. That is, in the present exemplary embodiment, as an example, projection image Im1 projected by projector 30 is a full-color moving picture, and image content D1 as contents of information for forming projection image Im1 is also data of a full-color moving picture.

The "real space" in the present disclosure means an actual space, that is, a space that actually exists, and includes an internal space (inside space) of a facility (building) that actually exists and an outdoor space. The facility here includes, for example, a non-residential facility such as a commercial facility, a theme park, an office building, a school, a welfare facility, a hospital, and a factory, and a facility such as an apartment house and a detached house. Non-residential facilities also include a theater, a movie theater, a community hall, a game hall, a complex facility, a restaurant, a department store, a hotel, an inn, a kindergarten, a library, a museum, an art gallery, an underground mall, a station, an airport, and the like. Furthermore, the "facility" in the present disclosure includes not only a building (structure) but also outdoor facilities such as a stadium, a parking lot, a ground, and a park. For example, in an internal space of a facility including a structure, a surface (a wall surface, a floor surface, a ceiling surface, and the like) of the structure of the facility such as a wall, a floor, or a ceiling may be projection surface A11 for projection of projection image Im1. Further, as in a door, a partition, a shelf, a desk, a chair, a home appliance, a screen, or the like, a surface of equipment (a tool, a fixture, a device, and apparatus) installed inside the facility may be projection surface A11 for projection of projection image Im1. In the outdoors, an outer wall, a roof, or a pillar of a facility including a structure, and further, a surface of an object such as the ground, a rock, or a tree may be projection surface A11 for projection of projection image Im1. In the present exemplary embodiment, as an example, a description will be made on a case where real space A1 is an indoor space (inside space) of one room of a non-residential facility such as a commercial facility, and a wall surface, a floor surface, a ceiling surface, or the like in the room is projection surface A11.

The "virtual space" in the present disclosure means a virtual space that does not actually exist, does not exist in an actual space (real space A1), and is not associated with an entity. Therefore, virtual space A2 is, for example, a virtual space including data that can be processed by one or more processors and reproduced by the computer system. Here, virtual space A2 is a space corresponding to real space A1 in which projection image Im1 is projected. In other words, virtual space A2 is a space imitating real space A1, and is, for example, a virtual space in which structures such as a wall, a floor, and a ceiling are laid out similarly to real space A1. Therefore, virtual space A2 includes virtual projection surface A21 (see FIG. 3A) corresponding to projection surface A11 on which projection image Im1 is projected in real space A1. However, virtual space A2 only needs to simulate real space A1 at least with respect to a layout of a surface of a structure including projection surface A11, and need not simulate real space A1 for an inside and a back side of the structure, a surface state of the structure, a layout of facilities such as a luminaire, and the like. In the present exemplary embodiment, as an example, virtual space A2 is a three-dimensional space represented by an XYZ orthogonal coordinate system having three axes of an X axis, a Y axis, and a Z axis orthogonal to each other.

Further, the "position" in the present disclosure may have a certain size and shape, or may be a "point" having no size. Therefore, for example, projection position P1 may be defined by a region having a certain size and shape in virtual space A2, or may be defined by a "point" on coordinates having no size. In the present exemplary embodiment, as an example, projection position P1 is assumed to include a region having a certain size (area) on projection surface A11. Similarly, display position P3 corresponding to projection position P1 is assumed to be a region having a certain size (area) in virtual space A2. On the other hand, reference position P2 is assumed to be a "point" having no size. Further, installation position P4 described later represents a position where projector 30 is installed in real space A1, and is assumed to be a "point" having no size. That is, installation position P4 is a position of one point (for example, a center point of mirror unit 32 to be described later) relatively determined with respect to projector 30. Further, reference position P2 and display position P3 in virtual space A2 are merely defined as being virtually present in virtual space A2 that is virtual, and do not exist in the actual space (real space A1) and are not associated with an entity.

The "object" in the present disclosure includes data that can be processed by one or more processors. The "object" does not exist in the actual space (real space), and is not associated with an entity. Object Ob1 is a virtual model in which some object (including an organism), a symbol, a number, a character, or the like is imaged, and may be either a two-dimensional model or a three-dimensional model. In the present exemplary embodiment, as an example, object Ob1 is assumed to be a two-dimensional model imitating a "butterfly" as illustrated in FIG. 1.

(3) Image Projection Support System

Hereinafter, a configuration of image projection system 100 including content generation system 10 according to the present exemplary embodiment will be described with reference to FIGS. 1 and 2.

(3.1) Overall Configuration

Content generation system 10 according to the present exemplary embodiment constitutes image projection system 100, together with projector 30 that actually projects generated image content D1. That is, image projection system 100 according to the present exemplary embodiment includes content generation system 10 and projector 30. Image projection system 100 can cover all the processing necessary for projecting projection image Im1 at projection position P1 in real space A1, from generation of image content D1 to projection of generated image content D1.

As described above, content generation system 10 includes, as a main configuration, the computer system having one or more processors and one or more memories. In the present exemplary embodiment, as an example, content generation system 10 is implemented by one information terminal 1 including a personal computer. That is, in information terminal 1, dedicated application software (program) is installed. Activating this application software causes information terminal 1 to function as content generation system 10 and embody the content generation method.

Furthermore, content generation system 10 is connected to display device 40 and input device 50. Then, content generation system 10 displays a screen on display device 40 to present information to a user, and receives an operation of the user by input device 50.

In other words, the content generation method according to the present exemplary embodiment is used on a graphical user interface (GUI) of the computer system. That is, the content generation method is a method of displaying a screen such as input support tool screen T1 (see FIG. 1) on information terminal 1 (content generation system 10) having the computer system as a main configuration. The "screen" such as input support tool screen T1 in the present disclosure is a picture (including text, a graph, an icon, and the like) displayed on display device 40. Therefore, according to the content generation method according to the present exemplary embodiment, the user can generate image content D1 on the graphical user interface.

Furthermore, in image projection system 100 according to the present exemplary embodiment, content generation system 10 is configured to be communicable with projector 30. The "communicable" in the present disclosure means that information can be exchanged directly or indirectly via a network, a repeater, or the like by an appropriate communication method of wired communication or wireless communication. That is, content generation system 10 and projector 30 can exchange information with each other. In the present exemplary embodiment, image content D1, control information D2, and the like can be transmitted at least from content generation system 10 to projector 30. As a result, image projection system 100 can transmit image content D1 generated by content generation system 10 to projector 30, and project image content D1 by projector 30.

As an example, in the present exemplary embodiment, content generation system 10 and projector 30 are wire-connected via video cable 101, control cable 102, and communication cable 103. Video cable 101 conforms to a communication standard such as HDMI (registered trademark) as an example, and is used for transmission of image content D1 from content generation system 10 to projector 30. As an example, control cable 102 conforms to a communication standard such as a local area network (LAN), and is used for transmission of control information D2 from content generation system 10 to projector 30. As an example, communication cable 103 conforms to a communication standard such as a LAN, and is used to exchange various types of information between content generation system 10 and projector 30. Control cable 102 and communication cable 103 may be shared by one LAN cable, or may be separately used for controlling mirror unit 32, which will be described later, and for controlling a main body of projector 30.

Projector 30 projects image content D1 generated by content generation system 10, at projection position P1 in real space A1. Here, projector 30 is installed at installation position P4 in real space A1. In the present exemplary embodiment, installation position P4 is a position of one point determined relative to projector 30 as described above, and is, as an example, a position of a center point of mirror unit 32 described later. That is, projector 30 is installed in real space A1 such that the center point of mirror unit 32 is located at installation position P4. Projector 30 uses image content D1 to project projection image Im1 at projection position P1 of projection surface A11 by irradiating, with light, projection surface A11 such as a wall surface, a floor surface, or a ceiling surface existing in real space A1.

In the present exemplary embodiment, projector 30 projects, in real time, image content D1 transmitted (distributed) from content generation system 10. In other words, content generation system 10 has a function as a video-reproducing device that reproduces image content D1 and outputs (transmits) a video signal. That is, in image projection system 100, content generation system 10 generates and reproduces image content D1, and projector 30 projects image content D1.

Display device 40 is implemented by, for example, a liquid crystal display, an organic electro luminescence (EL) display, or the like. Display device 40 receives a video signal from content generation system 10, and displays a "screen" such as input support tool screen T1 to present information to a user of the content generation method.

Input device 50 is implemented by, for example, a keyboard, a pointing device such as a mouse, a mechanical switch, a gesture sensor, or a voice input device. Input device 50 receives an operation (including a voice operation or the like) of the user of the content generation method, and outputs an operation signal corresponding to the operation of the user to content generation system 10.

At least one of display device 40 or input device 50 may be included in components of content generation system 10. In other words, content generation system 10 may be provided with at least one of display device 40 or input device 50. Furthermore, for example, display device 40 and input device 50 may be implemented by a touch panel display, and in this case, display device 40 and input device 50 are integrated.

(3.2) Projector

Next, a more detailed configuration of projector 30 will be described.

In the present exemplary embodiment, projector 30 is of a floor-mounted type that is used by being placed on a floor (including the ground). Therefore, depending on a position where projector 30 is placed and an orientation of projector 30 on the floor, a position (installation position P4) and an orientation of projector 30 in a horizontal plane can be freely set. Furthermore, projector 30 has, for example, an adjuster function at a leg portion that supports the main body, and can also adjust a height in a vertical direction by adjusting a height of the main body from a floor surface. This allows any setting of installation position P4, which is a position of a center point of a surface (reflecting surface) of mirror unit 32 of projector 30.

Here, as an example, as illustrated in FIG. 1, projector 30 is installed at a position appropriately away from any wall surface in real space A1 including an indoor space of the facility. This allows projector 30 to use image content D1 to project projection image Im1 at projection position P1 of projection surface A11, by irradiating, with light, projection surface A11 such as a wall surface, a floor surface, or a ceiling surface existing around projector 30.

Here, projector 30 is a movable projection system in which projection position P1 is not fixed and projection position P1 in real space A1 is variable. That is, projection position P1 is movable in real space A1. Here, projector 30 moves projection position P1 by changing a light irradiation direction. As an example, when projector 30 installed in front of projection surface A11 changes the light irradiation direction from a left end to a right end of projection surface A11, projection position P1 moves rightward on projection surface A11.

In the present exemplary embodiment, in particular, projector 30 is a moving mirror type projection system, and moves projection position P1 by moving mirror unit 32 located on an optical path of the irradiated light, to change the light irradiation direction. That is, as illustrated in FIG. 2, projector 30 includes projection unit 31, mirror unit 32, and drive unit 33. Projection unit 31 emits light for projecting projection image Im1 by using image content D1. Mirror unit 32 reflects the light emitted from projection unit 31. Drive unit 33 moves projection position P1 by driving mirror unit 32 so as to change an orientation of mirror unit 32. In short, in the present exemplary embodiment, by drive unit 33 causing mirror unit 32 to swing, mirror unit 32 changes a reflection direction of the light emitted from projection unit 31, to change the irradiation direction of the light (reflected light at mirror unit 32) from projector 30.

More specifically, as illustrated in FIG. 1, projection unit 31 includes, as an example, cylindrical optical unit 311 protruding upward from an upper surface of the main body of projector 30. Optical unit 311 includes a lens system including a plurality of lens elements. Projection unit 31 emits light upward from an opening on an upper surface of optical unit 311, along an optical axis of optical unit 311. The light emitted from projection unit 31 is light for projecting projection image Im1. When projection surface A11 is irradiated with this light, an image is formed on projection surface A11 and projection image Im1 is projected. When image content D1 is inputted, projection unit 31 emits an image corresponding to image content D1 as light. In the present exemplary embodiment, an optical axis of the light emitted from projection unit 31 is along the vertical direction and intersects with a center of a surface (reflecting surface) of mirror unit 32.

As an example, mirror unit 32 is a flat plane mirror having a polygonal (hexagonal) surface (reflecting surface), and is held by drive unit 33 so as to be swingable. As described above, since the light from projection unit 31 enters the center point of the surface of mirror unit 32 from below, mirror unit 32 is basically held with the surface facing obliquely downward. As a result, the light emitted upward from projection unit 31 is reflected laterally by the surface of mirror unit 32, and is emitted toward projection surface A11 such as a wall surface, a floor surface, or a ceiling surface existing around projector 30.

Drive unit 33 holds mirror unit 32 so as to be swingable, and drives mirror unit 32 so as to change an orientation of mirror unit 32. Drive unit 33 is implemented by, for example, an actuator including a motor and the like. By drive unit 33 driving mirror unit 32, the orientation of mirror unit 32 changes, and projection position P1 moves in real space A1. Drive unit 33 is controlled by control information D2 from content generation system 10. In other words, control information D2 transmitted from content generation system 10 to projector 30 is information used for control of drive unit 33, and is information for moving projection position P1 in real space A1.

In the present exemplary embodiment, drive unit 33 can perform two types of operations, which are: a "panning operation" of rotating about a vertical axis passing through the center point of the surface of mirror unit 32; and a "tilt operation" of rotating about a horizontal axis passing through the center point of the surface of mirror unit 32. According to the panning operation, an orientation of a normal line at the center point of the surface of mirror unit 32 changes along a horizontal direction, and an azimuth angle of mirror unit 32 changes. According to the tilt operation, the orientation of the normal line at the center point of the surface of mirror unit 32 changes along the vertical direction, and an elevation and depression angle of mirror unit 32 changes. In the present exemplary embodiment, drive unit 33 can freely change the orientation of mirror unit 32 about the center point of the surface of mirror unit 32, by combining the panning operation and the tilt operation. Therefore, projection position P1 irradiated with the light reflected by mirror unit 32 can be moved in vertical and horizontal two-dimensional directions on projection surface A11 including a wall surface, for example.

(3.3) Content Generation System

Next, a more detailed configuration of content generation system 10 will be described.

As described above, content generation system 10 includes first acquisition unit 11, third acquisition unit 13, second acquisition unit 12, and generation unit 14. As illustrated in FIG. 2, content generation system 10 according to the present exemplary embodiment includes virtual space formation unit 15 and object acquisition unit 16, in addition to first acquisition unit 11, second acquisition unit 12, third acquisition unit 13, and generation unit 14. Furthermore, content generation system 10 according to the present exemplary embodiment further includes control information generation unit 17, provision unit 18, input unit 19, output unit 20, communication unit 21, and data storage 22. That is, content generation system 10 includes first acquisition unit 11, second acquisition unit 12, third acquisition unit 13, generation unit 14, virtual space formation unit 15, object acquisition unit 16, control information generation unit 17, provision unit 18, input unit 19, output unit 20, communication unit 21, and data storage 22.

In the present exemplary embodiment, as described above, content generation system 10 includes, as a main configuration, the computer system having one or more processors and one or more memories. Therefore, in content generation system 10, functions (first acquisition unit 11, second acquisition unit 12, third acquisition unit 13, generation unit 14, and the like) other than communication unit 21 and data storage 22 are embodied by one or more processors executing a program.

As described above, first acquisition unit 11 executes the first acquisition process of acquiring space information. The space information is information regarding virtual space A2 corresponding to real space A1. In the present exemplary embodiment, first acquisition unit 11 acquires the space information from input unit 19.

As described above, second acquisition unit 12 executes the second acquisition process of acquiring display position information. The display position information relates to display position P3 corresponding to projection position P1 in virtual space A2. In the present exemplary embodiment, second acquisition unit 12 acquires the display position information from input unit 19.

As described above, third acquisition unit 13 executes the third acquisition process of acquiring reference position information. The reference position information is information regarding reference position P2 in virtual space A2. In the present exemplary embodiment, third acquisition unit 13 acquires the reference position information from input unit 19.

As described above, generation unit 14 executes the generation process of generating image content D1. In the generation process, based on the space information, the reference position information, and the display position information, an image including object Ob1 viewed from reference position P2 when object Ob1 is displayed at display position P3 in virtual space A2 is generated as image content D1. That is, generation unit 14 generates image content D1 based on the space information acquired by first acquisition unit 11, the reference position information acquired by third acquisition unit 13, and the display position information acquired by second acquisition unit 12. In the present exemplary embodiment, generation unit 14 generates image content D1 in a state where object Ob1 acquired by object acquisition unit 16 is virtually displayed at display position P3 in virtual space A2 formed by virtual space formation unit 15. The virtual display of object Ob1 at display position P3 is executed by generation unit 14.

In the present exemplary embodiment, as an example, generation unit 14 virtually installs virtual camera V30 (see FIG. 3C) at reference position P2 in virtual space A2. The "virtual camera" in the present disclosure is a virtual device imitating a function of a camera, and is merely defined to exist virtually in virtual space A2 that is virtual. The "virtual camera" does not exist in the actual space (real space A1), and is not associated with an entity. In the present exemplary embodiment, virtual camera V30 imitates a function of a video camera capable of capturing a full-color moving picture. Here, in virtual space A2, virtual camera V30 is installed at a position corresponding to projector 30 installed in real space A1.

In the present exemplary embodiment, reference position P2 represents a position where virtual camera V30 is installed in virtual space A2, and is a "point" having no size, similarly to installation position P4. In other words, in virtual space A2, reference position P2 is a position corresponding to installation position P4 in real space A1. Here, reference position P2 is a position of one point relatively determined with respect to virtual camera V30, and is a position of a center point of virtual mirror unit V32 to be described later, as an example. That is, virtual camera V30 is virtually installed in virtual space A2 such that the center point of virtual mirror unit V32 is located at reference position P2.

Similarly to a general camera, virtual camera V30 has a function of capturing an image of a subject that is present in a field of view of virtual camera V30, and outputting a picture appearing in the field of view as an image (image signal). Therefore, when an image of display position P3 is captured by virtual camera V30 in a state where object Ob1 is virtually displayed at display position P3 in virtual space A2, an image including object Ob1 viewed from reference position P2 is outputted from virtual camera V30. That is, the image outputted at this time is an image including object Ob1 viewed from reference position P2 when object Ob1 is displayed at display position P3 in virtual space A2. Therefore, after such virtual camera V30 is defined, generation unit 14 generates image content D1 by setting the image captured by virtual camera V30 as image content D1.

Virtual space formation unit 15 executes a virtual space forming process of forming virtual space A2. Virtual space formation unit 15 forms virtual space A2 based on the space information acquired by first acquisition unit 11.

Object acquisition unit 16 executes an object acquisition process of acquiring object information regarding object Ob1. In the present exemplary embodiment, object acquisition unit 16 acquires the object information from input unit 19. Object Ob1 of the object information acquired by object acquisition unit 16 is virtually displayed at display position P3 in virtual space A2 by generation unit 14.

Control information generation unit 17 executes a control information generation process of generating control information D2. In the control information generation process, control information D2 of projector 30 for movement of projection position P1 in real space A1 is generated in synchronization with movement of display position P3. Control information D2 generated by control information generation unit 17 is outputted from output unit 20.

Provision unit 18 executes a provision process of providing an input support tool. The input support tool is a tool to allow the user to input display position information in the second acquisition process. The input support tool presents at least display position P3 in virtual space A2. In the present exemplary embodiment, the input support tool is embodied in input support tool screen T1. That is, the input support tool is a tool used on the graphical user interface of the computer system, and is not associated with an entity.

Input unit 19 receives inputs of various types of information and signals from outside of content generation system 10. Input unit 19 receives at least an input of an operation signal from input device 50. This allows content generation system 10 to indirectly receive, by input device 50, an operation (including a voice operation and the like) of the user of the content generation method. Input unit 19 may receive inputs of information and signals from outside via communication unit 21.

Output unit 20 outputs at least image content D1 generated by generation unit 14. Output unit 20 also outputs control information D2 generated by control information generation unit 17. Further, output unit 20 outputs a video signal for displaying a screen such as input support tool screen T1 on display device 40. Here, an aspect of the output in output unit 20 includes, for example, display, communication (transmission), sound, printing (print-out), recording (writing) on a non-transitory recording medium, and the like. In the present exemplary embodiment, as an example, at least for image content D1 and control information D2, output unit 20 performs output by recording (writing) to data storage 22 and output by communication (transmission) from communication unit 21 to projector 30.

Communication unit 21 has a function of communicating with projector 30. In the present exemplary embodiment, communication unit 21 is wire-connected to projector 30 via video cable 101, control cable 102, and communication cable 103.

Data storage 22 stores image content D1, control information D2, and the like. Further, data storage 22 also stores the space information acquired by first acquisition unit 11, the reference position information acquired by third acquisition unit 13, and the display position information acquired by second acquisition unit 12. Furthermore, data storage 22 stores information and the like necessary for arithmetic operation in first acquisition unit 11, third acquisition unit 13, second acquisition unit 12, generation unit 14, and the like. Data storage 22 includes a rewritable nonvolatile memory such as an electrically erasable programmable read-only memory (EEPROM).

An operation of each unit of content generation system 10 will be described in detail in the section of "(4) Content generation method".

Meanwhile, as described above, content generation system 10 according to the present exemplary embodiment has a function of generating image content D1 and a function as a video-reproducing device that reproduces generated image content D1 and outputs (transmits) a video signal. However, in the present exemplary embodiment, a case is assumed in which generation of image content D1 in content generation system 10 and reproduction (output of the video signal) of image content D1 in content generation system 10 are not performed simultaneously, but are performed under different situations.

Therefore, content generation system 10 according to the present exemplary embodiment has at least two modes of a generation mode and a reproduction mode, as operation modes. The generation mode is an operation mode for generating image content D1. During the operation in the generation mode, content generation system 10 generates image content D1, and memorizes (stores) generated image content D1 into data storage 22. The reproduction mode is an operation mode for reproducing image content D1. During the operation in the reproduction mode, content generation system 10 reproduces image content D1 stored in data storage 22, and outputs (transmits) a video signal to projector 30. Switching of the operation modes (the generation mode and the reproduction mode) may be manually performed by a user's operation on input device 50, or may be automatically performed, for example.

(4) Content Generation Method

Hereinafter, with reference to FIGS. 3A to 11, a description will be made in detail on an operation in the generation mode of content generation system 10 according to the present exemplary embodiment, that is, the content generation method according to the present exemplary embodiment.

(4.1) Overall

Figure 3A:
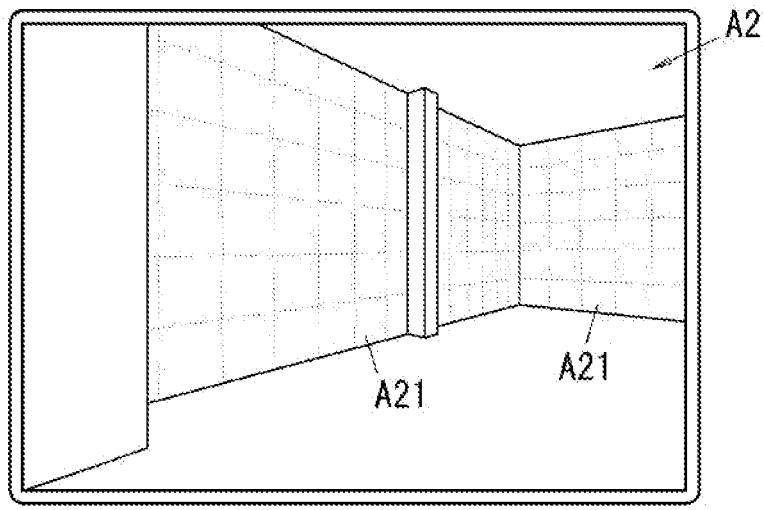
FIG. 3A is an explanatory view of a virtual space formed by a content generation method according to the first exemplary embodiment.
Figure 3B:
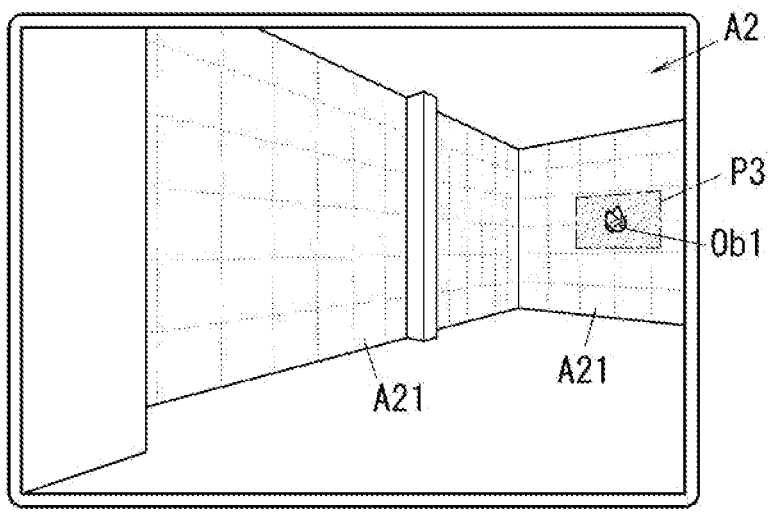
FIG. 3B is an explanatory view of a state in which an object is displayed in the virtual space by the content generation method described above.
Figure 3C:
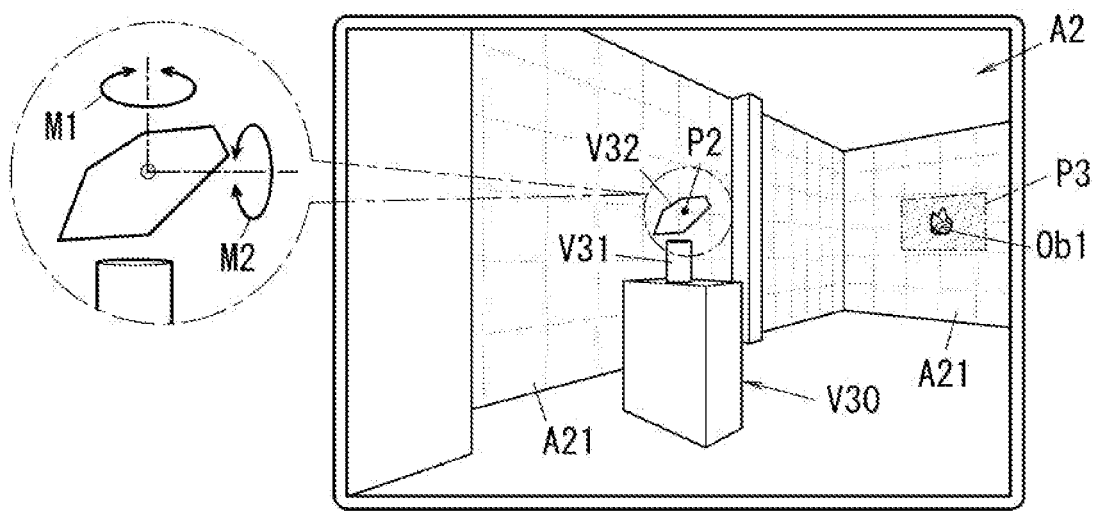
FIG. 3C is an explanatory view of a state in which a virtual camera is arranged in the virtual space by the content generation method described above.
Figure 5:
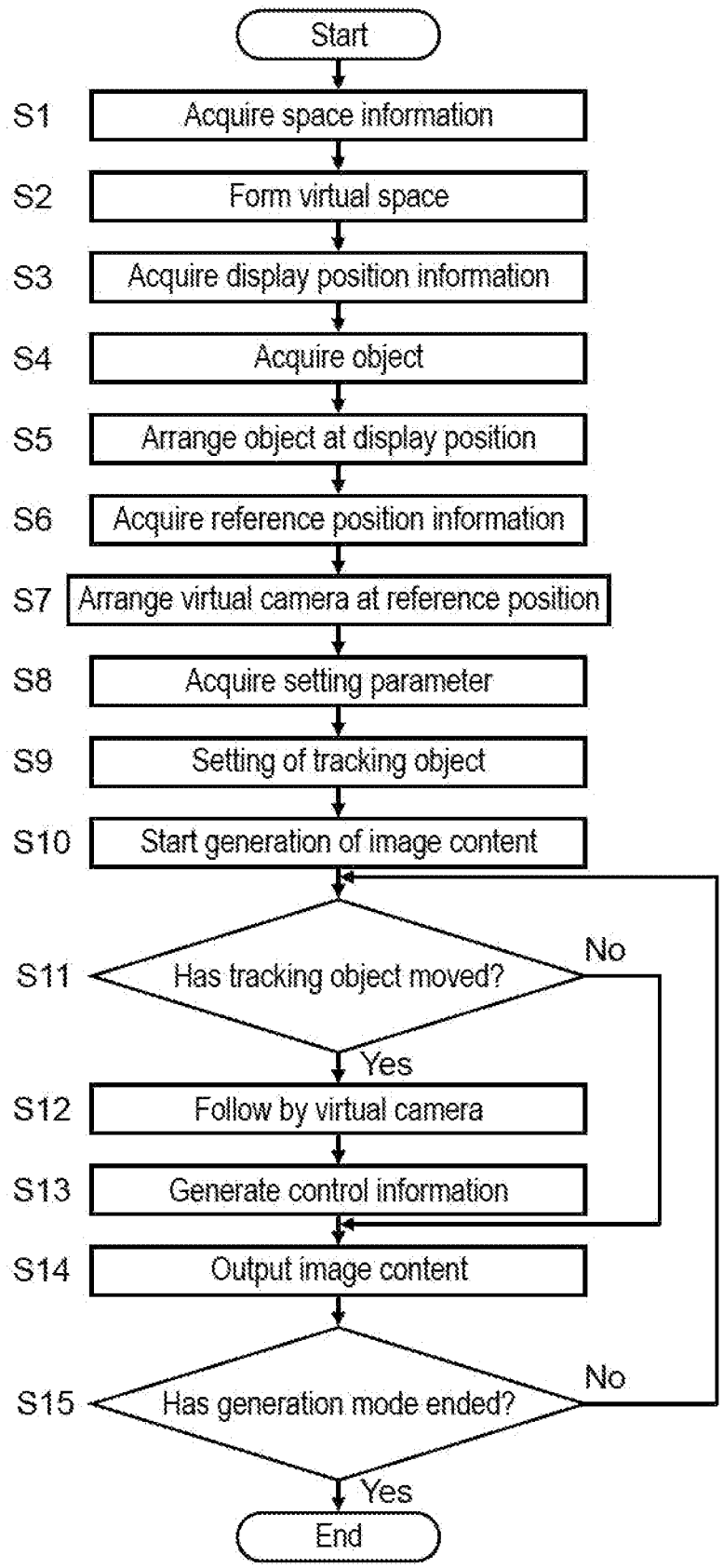
FIG. 5 is a flowchart illustrating an example of the content generation method described above.

Here, first, an overall operation of content generation system 10 according to the present exemplary embodiment, that is, the entire content generation method will be described with reference to FIGS. 3A to 5. FIGS. 3A to 3C are explanatory views visualizing virtual space A2 according to the content generation method. FIG. 4 is an explanatory view conceptually illustrating a flow of a process of generating image content D1 by virtual camera V30 in virtual space A2, and projecting generated image content D1 by projector 30 in real space A1. FIG. 5 is a flowchart illustrating an example of the entire content generation method according to the present exemplary embodiment.

In generating image content D1, first, in order to form virtual space A2 as illustrated in FIG. 3A, content generation system 10 executes, by first acquisition unit 11, the first acquisition process of acquiring space information regarding virtual space A2 (S1 in FIG. 5). The space information is used to form virtual space A2 corresponding to real space A1, and thus is, for example, information for specifying a layout of structures constituting a space, such as a wall, a floor, and a ceiling in real space A1. That is, according to the space information obtained by copying the layout of these structures, it is possible to form virtual space A2 imitating real space A1. In the present exemplary embodiment, since virtual space A2 is a three-dimensional space represented by the XYZ orthogonal coordinate system, the space information includes a coordinate position in the XYZ orthogonal coordinate system. Specifically, in the first acquisition process, parameters for modeling structures such as a wall, a floor, and a ceiling forming virtual space A2 on software of three-dimensional computer graphics (3D CG) are acquired as the space information. In the first acquisition process, a three-dimensional measurement result of real space A1 or CAD data of real space A1 may be acquired as the space information.

Next, content generation system 10 uses the acquired space information to form virtual space A2 as illustrated in FIG. 3A, in virtual space formation unit 15 (S2 in FIG. 5). Virtual space A2 is a virtual space that does not actually exist, and is a virtual space including data that can be processed by one or more processors and to be reproduced by the computer system. Therefore, virtual space A2 is to be formed by inputting a parameter as the space information on software of three-dimensional computer graphics (3D CG). In virtual space A2 formed in this manner, for example, surfaces of structures such as a wall, a floor, and a ceiling are to be virtual projection surface A21 corresponding to the projection surface A11 in real space A1. At this stage (the stage of FIG. 3A), virtual camera V30 is not installed in virtual space A2.

However, in virtual space A2, a reduction scale (scale) having the same length (dimension) as that of real space A1 is not required. Therefore, for example, in a case of a wall, it suffices that an aspect ratio is the same between real space A1 and virtual space A2, and a height dimension may be different between real space A1 and virtual space A2.

Next, in order to specify display position P3 as illustrated in FIG. 3B, content generation system 10 executes, by second acquisition unit 12, the second acquisition process of acquiring display position information regarding display position P3 (S3 in FIG. 5). The display position information is used to specify display position P3 corresponding to projection position P1 in virtual space A2, and thus is, for example, information for specifying a position in virtual projection surface A21 including surfaces of the structure such as a wall, a floor, and a ceiling in virtual space A2. In particular, since display position P3 is a region having a certain size (area) in virtual space A2, the display position information is information indicating a specific region (range) on virtual projection surface A21. Further, in the present exemplary embodiment, since virtual space A2 is a three-dimensional space represented by the XYZ orthogonal coordinate system, the display position information includes a coordinate position in the XYZ orthogonal coordinate system.

Next, in order to display object Ob1 as illustrated in FIG. 3B, content generation system 10 executes, by object acquisition unit 16, an object acquisition process of acquiring object information regarding object Ob1 (S4 in FIG. 5). In the present exemplary embodiment, as an example, object Ob1 is a two-dimensional model imitating a "butterfly". Therefore, object acquisition unit 16 acquires data for reproducing such object Ob1 as the object information. Specifically, in the object acquisition process, data for displaying object Ob1 on virtual projection surface A21 on software of three-dimensional computer graphics is acquired as the object information.

Next, content generation system 10 uses the acquired display position information and object information to execute, by generation unit 14, an object arrangement process of arranging object Ob1 as illustrated in FIG. 3B at display position P3 in virtual space A2 (S5 in FIG. 5). That is, generation unit 14 arranges object Ob1 specified by the object information, at display position P3 specified by the display position information. When object Ob1 is arranged at display position P3 set on virtual projection surface A21 in virtual space A2, object Ob1 is virtually displayed. However, object Ob1 only needs to be arranged in the vicinity of virtual projection surface A21 that is to be display position P3, and does not need to be precisely arranged on virtual projection surface A21. Alternatively, object Ob1 generated as a plane image may be arranged as a texture on virtual projection surface A21, or may be arranged by projection on virtual projection surface A21.

Next, in order to install virtual camera V30 as illustrated in FIG. 3C, content generation system 10 executes, by third acquisition unit 13, the third acquisition process of acquiring reference position information regarding reference position P2 (S6 in FIG. 5). The reference position information is used to specify reference position P2 where virtual camera V30 is installed in virtual space A2, and thus is, for example, information for specifying installation position P4 where projector 30 is installed in real space A1. That is, according to the reference position information obtained by copying installation position P4 in real space A1, in virtual space A2, virtual camera V30 can be installed at the same position as projector 30 in real space A1. In the present exemplary embodiment, since virtual space A2 is the three-dimensional space represented by the XYZ orthogonal coordinate system, the reference position information includes a coordinate position in the XYZ orthogonal coordinate system.

Next, content generation system 10 uses the acquired reference position information to arrange, by generation unit 14, virtual camera V30 as illustrated in FIG. 3C at reference position P2 in virtual space A2 (S7 in FIG. 5). Virtual camera V30 is a virtual device defined to virtually exist in virtual space A2 that is virtual, and is a virtual device including data that can be processed by one or more processors and to be reproduced by the computer system. Therefore, virtual camera V30 is arranged by inputting a parameter as the reference position information on software of three-dimensional computer graphics.

Here, as illustrated in FIG. 3C, virtual camera V30 includes a virtual device imitating projector 30 in terms of an appearance shape and a specification. That is, in accordance with movable projector 30, virtual camera V30 includes a movable camera system in which a field of view is not fixed but the field of view in virtual space A2 is variable. That is, the field of view of virtual camera V30 is movable in virtual space A2. Here, virtual camera V30 moves the field of view by changing an incident direction of light. As an example, when virtual camera V30 installed in front of virtual projection surface A21 changes the incident direction of light from a left end to a right end of virtual projection surface A21, the field of view moves rightward on virtual projection surface A21.

In the present exemplary embodiment, in particular, in accordance with moving mirror type projector 30, virtual camera V30 includes a moving mirror type camera system. That is, by moving virtual mirror unit V32 located on an optical path of the incident light, virtual camera V30 changes the incident direction of the light to move the field of view. That is, as illustrated in FIG. 3C, virtual camera V30 includes virtual image-capturing unit V31 and virtual mirror unit V32. Virtual image-capturing unit V31 captures an image of a subject that is present in the field of view, and outputs a picture appearing in the field of view as an image (image signal). Virtual mirror unit V32 reflects light arriving from surroundings, toward virtual image-capturing unit V31. Virtual camera V30 moves the field of view of virtual camera V30 by driving virtual mirror unit V32 so as to change an orientation of the virtual mirror unit V32. In short, in the present exemplary embodiment, by causing virtual mirror unit V32 to swing, virtual camera V30 causes virtual mirror unit V32 to change an incoming direction of light incident on virtual image-capturing unit V31, to change the incident direction of the light on virtual camera V30.

Furthermore, virtual camera V30 imitates projector 30 also for the incident direction of light of virtual image-capturing unit V31, the shape of virtual mirror unit V32, the operation of virtual mirror unit V32, and the like. For example, an optical axis of the light incident on virtual image-capturing unit V31 is along a vertical direction and intersects with a center or a rotation center of a surface (reflecting surface) of virtual mirror unit V32. Further, virtual mirror unit V32 can freely change the orientation about a center point of the surface of virtual mirror unit V32, for example, by combining the panning operation and the tilt operation. In FIG. 3C, a moving (rotating) direction of virtual mirror unit V32 during the panning operation is indicated by arrow M1, while a moving (rotation) direction of virtual mirror unit V32 during the tilt operation is indicated by arrow M2. Furthermore, a viewing angle (angle of view) of virtual camera V30 is the same as the angle of view of projector 30.

At this time, if reference position P2 is in the vicinity of optical unit 311 of projector 30, it becomes easy to reproduce real space A1 more precisely. Furthermore, if reference position P2 is in the vicinity of a pupil (projection pupil) position of optical unit 311 of projector 30, real space A1 can be more precisely reproduced.

As described above, since virtual camera V30 is defined by imitating the appearance shape and the specification of projector 30, at least a setting parameter for specifying the appearance shape and the specification of projector 30 is required for setting virtual camera V30. Therefore, content generation system 10 according to the present exemplary embodiment executes a parameter acquisition process for acquiring a setting parameter (S8 in FIG. 5). The setting parameter is used for setting virtual camera V30, and thus is, for example, information for specifying a reduction scale of virtual space A2, a specification of optical unit 311 of projector 30, a type of projector 30, vignetting occurring in projector 30, and the like. Furthermore, a parameter such as resolution of virtual camera V30 is also included in the setting parameter. The setting parameter acquired in the parameter acquisition process is reflected in the appearance shape and the specification of virtual camera V30.

As an example, the user freely sets the reduction scale of virtual space A2 by a ratio of a length (dimension) of virtual space A2 to that of real space A1. The reduction scale of virtual space A2 is used for adjusting a size of projector 30, calculating a projection distance, and the like. In addition, as another example, the specification of optical unit 311 is designated by displaying a list of projection lenses on display device 40, and allowing the user to select the projection lens of projector 30 from the list. As another example, a screen for receiving an input of a parameter (a zoom magnification, a focal distance, brightness of lens system, or the like) of a projection lens may be displayed on display device 40, and the parameter of the projection lens may be freely set by the user. As another example, a projection lens recommended from the space information may be designated as the specification of optical unit 311, such that, for example, a telephoto lens is recommended in a wide space, and a wide-angle lens is recommended in a narrow space. Similarly, the type of projector 30 is designated by displaying a list of types of projector 30 on display device 40, and allowing the user to select the type of projector 30 from the list. As another example, projector 30 of a type recommended in accordance with brightness of projection image Im1 desired by the user may be designated as the type of projector 30. As still another example, content generation system 10 may communicate with projector 30, to acquire a specification of projector 30 including the specification of optical unit 311 from projector 30. Resolution and the like of virtual camera V30 are freely set by the user. The resolution of virtual camera V30 may be automatically set so as to match resolution of the designated (selected) projector 30.

After acquiring the setting parameter, content generation system 10 executes a tracking setting process of setting a tracking object (S9 in FIG. 5). The "tracking object" in the present disclosure is, among objects Ob1, object Ob1 that follows projection position P1 and moves in real space A1, when projection position P1 moves in real space A1. That is, even if projection position P1 moves, object Ob1 set as the tracking object moves following projection position P1 and is to be continuously projected at projection position P1. Object Ob1 set as the tracking object is to be a tracking target by virtual camera V30. In the present exemplary embodiment, since the number of objects Ob1 is one, the only one object Ob1 is set as the tracking object. Specifically, the user sets an object name (as an example, "Butterfly") and a position (coordinate position) of a representative point of object Ob1, for object Ob1 designated as the tracking object.

Through the processing so far (S1 to S9 in FIG. 5), content generation system 10 is ready to generate image content D1. Therefore, content generation system 10 starts a generation process of generating image content D1 in generation unit 14 (S10 in FIG. 10).

In the generation process, basically, as illustrated in FIG. 4, in a state where object Ob1 is virtually displayed at display position P3 in virtual space A2, generation unit 14 captures an image of display position P3 by virtual camera V30 in virtual space A2. That is, in virtual space A2, an image when object Ob1 displayed at display position P3 is captured by virtual camera V30 at reference position P2 is to be generated by virtual camera V30. This allows content generation system 10 to generate an image including object Ob1 viewed from reference position P2 as image content D1 as illustrated in FIG. 4, by virtual camera V30 defined by generation unit 14.

However, virtual camera V30 merely virtually captures an image of a subject that is present in the field of view of virtual camera V30, and outputs a picture appearing in the field of view as an image (image signal). Therefore, strictly speaking, the image outputted from virtual camera V30 is not an actually captured image but a rendered image generated (rendered) by arithmetic processing. In any case, the image outputted from virtual camera V30 at this time is an image including object Ob1 viewed from reference position P2 when object Ob1 is displayed at display position P3 in virtual space A2. Therefore, generation unit 14 generates image content D1 by setting the image virtually captured by virtual camera V30 as image content D1.

In the present exemplary embodiment, image content D1 is (full-color) moving picture data. Therefore, generation unit 14 continuously generates image content D1 by continuously capturing an image of object Ob1 with virtual camera V30 while the generation process is continued. That is, when virtual camera V30 in virtual space A2 captures an image of object Ob1 displayed at display position P3 so as to capture a moving picture, generation unit 14 generates image content D1 including moving picture data. Therefore, in a case where object Ob1 has motion, that is, in a case where object Ob1 is an animation or the like that deforms with the lapse of time, the motion of object Ob1 is reflected in image content D1. As an example, in a case where object Ob1 of the "butterfly" has "motion" such as flapping as illustrated in FIG. 4, image content D1 is to be data of a moving picture in which the "butterfly" flaps.

Then, as illustrated in FIG. 4, image content D1 generated in this way can be projected by projector 30 in real space A1 by being transmitted to projector 30. As illustrated in FIG. 4, in real space A1, projection image Im1 projected at this time is to be displayed at projection position P1 corresponding to display position P3 in virtual space A2. Moreover, when projector 30 projects image content D1 at projection position P1, object Ob1 to be projected substantially coincide with object Ob1 virtually displayed at display position P3. Therefore, in real space A1, object Ob1 virtually displayed in virtual space A2 is projected as projection image Im1 as if virtual space A2 has been copied. Processing when image content D1 is actually projected by projector 30 will be described in detail in the section of "(5) Content projection method".

Here, in the present exemplary embodiment, image content D1 is an image of object Ob1 excluding a background of object Ob1 in virtual space A2. That is, since an image virtually captured by virtual camera V30 is set as image content D1, strictly speaking, virtual projection surface A21 or the like that is the background of object Ob1 may appear in image content D1. Therefore, generation unit 14 extracts only object Ob1 from the image captured by virtual camera V30, to generate image content D1. That is, in image content D1 illustrated in FIG. 4, a periphery of object Ob1 is transparent (a state in which image data does not exist).

This causes image content D1 generated by generation unit 14 to be data of an image of only object Ob1 excluding the background. Specifically, when object Ob1 is displayed at display position P3 in virtual space A2, a portion that is inside display position P3 and other than object Ob1, that is, a portion corresponding to the background is to be displayed in black in which a pixel value (luminance value) is 0. Since projector 30 does not irradiate a black image with light, as a result, the image of only object Ob1 excluding the background is generated as image content D1.

Meanwhile, in the present exemplary embodiment, projector 30 that projects generated image content D1 is a movable projection system in which projection position P1 in real space A1 is variable as described above, and projection position P1 is movable in real space A1. Therefore, display position P3 corresponding to projection position P1 can also move in virtual space A2 similarly to projection position P1. In other words, when projection position P1 is moved by projector 30 that projects image content D1, display position P3 is moved at a time of generation of image content D1. In this case, object Ob1 (tracking object) displayed at display position P3 also moves in virtual space A2.

Therefore, in content generation system 10 according to the present exemplary embodiment, even during the execution of the generation process, second acquisition unit 12 executes the second acquisition process of acquiring display position information regarding display position P3 as needed. Further, even during the execution of the generation process, content generation system 10 executes the object arrangement process of arranging object Ob1 at display position P3 in generation unit 14 as needed. That is, in the flowchart of FIG. 5, even after the start of the generation process (S10), the second acquisition process (corresponding to S3) of acquiring the display position information and the object arrangement process (corresponding to S5) of arranging object Ob1 at display position P3 are repeatedly executed.

Movement of display position P3 is realized, for example, by receiving an input of display position information by the user as needed on the input support tool provided by provision unit 18. That is, on the input support tool used on the graphical user interface, for example, when the user designates any position in virtual space A2 by an operation of a pointing device included in input device 50, this position is designated as display position P3. Therefore, the display position information is sequentially inputted by moving the pointing device, and movement of display position P3 is realized in real time in accordance with the movement of the pointing device. The input support tool will be described in detail in the section of "(4.2) Input support tool".

Then, content generation system 10 determines, by generation unit 14, whether or not the tracking object has moved after the start of the generation process (S11 in FIG. 5). That is, in the present exemplary embodiment, among objects Ob1, object Ob1 that follows projection position P1 and moves in real space A1 when projection position P1 moves in real space A1, is defined as a "tracking object". Therefore, in the second acquisition process after the start of the generation process, if there is a change in display position P3 corresponding to projection position P1, generation unit 14 determines that the tracking object moves (S11: Yes). Whereas, in the second acquisition process after the start of the generation process, if there is no change in display position P3 corresponding to projection position P1, generation unit 14 determines that the tracking object does not move (S11: No).

When the tracking object does not move (S11: No), that is, when object Ob1 displayed at display position P3 remains at one position, content generation system 10 skips the processes S12 and S13 in FIG. 5 and outputs image content D1 (S14). At this time, content generation system 10 outputs image content D1 by recording (writing) image content D1 onto data storage 22 by output unit 20. This causes image content D1 generated by the generation process to be recorded (saved) in data storage 22 as needed.

Whereas, when the tracking object moves (S11: Yes), that is, when object Ob1 displayed at display position P3 moves, content generation system 10 follows object Ob1 (tracking object) by virtual camera V30 (S12 in FIG. 5). At this time, content generation system 10 automatically controls, by generation unit 14, virtual camera V30 such that a representative point of object Ob1 set as the tracking object is positioned on an optical axis (center of the field of view) of virtual camera V30. Specifically, generation unit 14 causes virtual mirror unit V32 to swing, to change an incoming direction of light incident on virtual image-capturing unit V31 by virtual mirror unit V32 to change an orientation of the optical axis (center of the field of view) of virtual camera V30.

Then, while following object Ob1 with virtual camera V30, generation unit 14 continuously generates image content D1 by continuously capturing an image of object Ob1 with virtual camera V30 while the generation process is continued. Here, content generation system 10 executes, by control information generation unit 17, a control information generation process of generating control information D2 (S13 in FIG. 5). That is, in the control information generation process, control information D2 of projector 30 for movement of projection position P1 in real space A1 is generated in synchronization with movement of display position P3. In other words, in the control information generation process, control information D2 is generated in synchronization with movement of the tracking object (object Ob1) in virtual space A2.

In the present exemplary embodiment, content generation system 10 generates, as control information D2, information to be used for control of virtual camera V30 when following the tracking object with virtual camera V30. Specifically, in the control information generation process, the information used by generation unit 14 to cause virtual mirror unit V32 to swing is generated as control information D2. In short, a parameter to be used to control virtual mirror unit V32 of virtual camera V30 in virtual space A2 is coincident with control information D2 that is a parameter to be used to control mirror unit 32 of projector 30 in real space A1.

Then, after the generation of control information D2, content generation system 10 also outputs control information D2 in addition to the output of image content D1 (S14 in FIG. 5). That is, content generation system 10 outputs image content D1 and control information D2 by recording (writing) image content D1 and control information D2 onto data storage 22 by output unit 20. This causes image content D1 generated by the generation process to be recorded (saved) in data storage 22 as needed, together with control information D2 generated by the control information generation process.

As a result, in the generation process, an image that is viewed from reference position P2 and is of object Ob1 displayed at display position P3 that moves in virtual space A2 is generated as image content D1 including a moving picture. That is, in a case where the tracking object moves in virtual space A2, content generation system 10 continuously captures an image of object Ob1 with virtual camera V30, while following object Ob1 (tracking object) with virtual camera V30. Therefore, there is generated, as image content D1, such an image (moving picture) that is obtained by capturing, from reference position P2, a moving picture of object Ob1 displayed at display position P3 that moves in virtual space A2.

Further, in the generation process, an orientation of object Ob1 in image content D1 is changed in accordance with a position of display position P3 in virtual space A2. That is, in the generation process, a rotation process of rotating object Ob1 in image content D1 in accordance with movement of display position P3 is executed. Such rotation process is particularly useful in a case where projector 30 is a moving mirror type projection system. In short, in projector 30, in a case where the orientation of object Ob1 in image content D1 is constant, for example, when mirror unit 32 rotates by 90 degrees by the panning operation, object Ob1 in projection image Im1 projected on projection surface A11 rotates by 90 degrees. Therefore, in order to keep the orientation (position) of object Ob1 in projection image Im1 constant in real space A1, it is necessary to rotate object Ob1 in image content D1 in accordance with the orientation of mirror unit 32, that is, projection position P1.

Therefore, in the present exemplary embodiment, in the generation process, by changing the orientation of object Ob1 in image content D1 in accordance with the position of display position P3, image content D1 in which object Ob1 rotates in accordance with projection position P1 is generated. Specifically, since virtual camera V30 is a moving mirror type camera system, the orientation of object Ob1 in image content D1 automatically changes in accordance with the position of display position P3 when a picture reflected by virtual mirror unit V32 is captured by virtual image-capturing unit V31. That is, in virtual camera V30, in a case where the orientation of object Ob1 at display position P3 is constant, for example, when virtual mirror unit V32 rotates 90 degrees by the panning operation, object Ob1 in the image captured by virtual image-capturing unit V31 rotates 90 degrees. At this time, object Ob1 rotates about a rotation center of virtual mirror unit V32, that is, reference position P2.

Furthermore, in the present exemplary embodiment, control information D2 includes not only information for controlling drive unit 33 that drives mirror unit 32, but also information for controlling other than mirror unit 32 and drive unit 33 in projector 30. Specifically, for example, control information D2 may include control parameters such as a focus in projector 30, a light amount of a light source, zoom, and lens shift. These parameters are also generated in synchronization with movement of display position P3 in the control information generation process. That is, parameters such as a focus and a light amount of a light source are generated as control information D2 in synchronization with movement of the tracking object (object Ob1) in virtual space A2.

As an example, in a case of the focus, a value corresponding to a distance from reference position P2 where virtual camera V30 is arranged in virtual space A2 to display position P3 is calculated so as to match a projection distance in real space A1. In a case of the light amount of the light source, a value corresponding to a size (area) of display position P3 in virtual space A2 is calculated so as to match a size (area) of projection position P1 in real space A1. For example, the light amount of the light source is set to be larger (brighter) as projection position P1 (display position P3) becomes wider, so as to suppress variation in a light amount per unit area in projection image Im1. However, the light amount of the light source may be adjusted by a pixel value (luminance value) in image content D1 instead of control information D2.

In a case of the zoom, a value corresponding to a distance from reference position P2 where virtual camera V30 is arranged in virtual space A2 to display position P3 is calculated so as to match a projection distance in real space A1. For example, the zoom is set to a wide side as a distance from reference position P2 to display position P3 becomes shorter, so as to suppress variation in an area of projection image Im1. Here, the zoom is preferably reflected also in an angle of view of virtual camera V30. In a case of the lens shift, a value corresponding to a relative positional relationship between reference position P2 where virtual camera V30 is arranged in virtual space A2 and display position P3 is calculated, so as to suppress vignetting in an image captured by virtual camera V30. The lens shift is also preferably reflected on a position (reference position P2) of virtual camera V30.

Then, as illustrated in FIG. 5, after the output of image content D1 (and control information D2) (S14), content generation system 10 determines whether or not the operation in the generation mode ends (S15). The end of the generation mode is realized, for example, by the user performing a predetermined end operation on the input support tool provided by provision unit 18. When the generation mode has not ended (S15: No), content generation system 10 returns to process S11 and continues the generation of image content D1. Whereas, when the generation mode has ended (S15: Yes), content generation system 10 ends a series of operations related to the content generation method.

As described above, in the content generation method according to the present exemplary embodiment, image content D1 is generated by the generation process based on the space information acquired by the first acquisition process, the reference position information acquired by the third acquisition process, and the display position information acquired by the second acquisition process. At this time, in the generation process, by using virtual camera V30, an image including object Ob1 viewed from reference position P2 when object Ob1 is displayed at display position P3 in virtual space A2 is generated as image content D1.

Furthermore, in the present exemplary embodiment, projection position P1 is movable in real space A1. Then, in the second acquisition process, there is acquired the display position information regarding display position P3 that moves in virtual space A2 in accordance with movement of projection position P1. That is, display position P3 corresponding to projection position P1 is movable in virtual space A2. Further, second acquisition unit 12 executes the second acquisition process of acquiring the display position information regarding display position P3 as needed even during the execution of the generation process. As a result, in the second acquisition process, the display position information regarding display position P3 that moves in virtual space A2 can be acquired. Here, since virtual camera V30 is a movable camera system in which a field of view in virtual space A2 is variable, an image of object Ob1 at display position P3 can be captured by following display position P3 that moves in virtual space A2 in this way.

In particular, in the present exemplary embodiment, virtual camera V30 includes virtual image-capturing unit V31 and virtual mirror unit V32, and moves the field of view of virtual camera V30 by driving virtual mirror unit V32 so as to change the orientation of the virtual mirror unit V32. That is, since virtual camera V30 is a moving mirror type camera system, an image of object Ob1 at display position P3 can be captured by following display position P3 that moves in virtual space A2, by driving virtual mirror unit V32.

The flowchart illustrated in FIG. 5 is merely an example, and the order of the processes may be appropriately changed, or the processes may be appropriately added or deleted.

(4.2) Input Support Tool

Next, the input support tool will be described with reference to FIGS. 6 to 11.

The content generation method according to the present exemplary embodiment includes a provision process of providing an input support tool in provision unit 18. In the present exemplary embodiment, at least when the operation mode of content generation system 10 is the generation mode, the provision process is executed to provide the input support tool.

Figure 6:
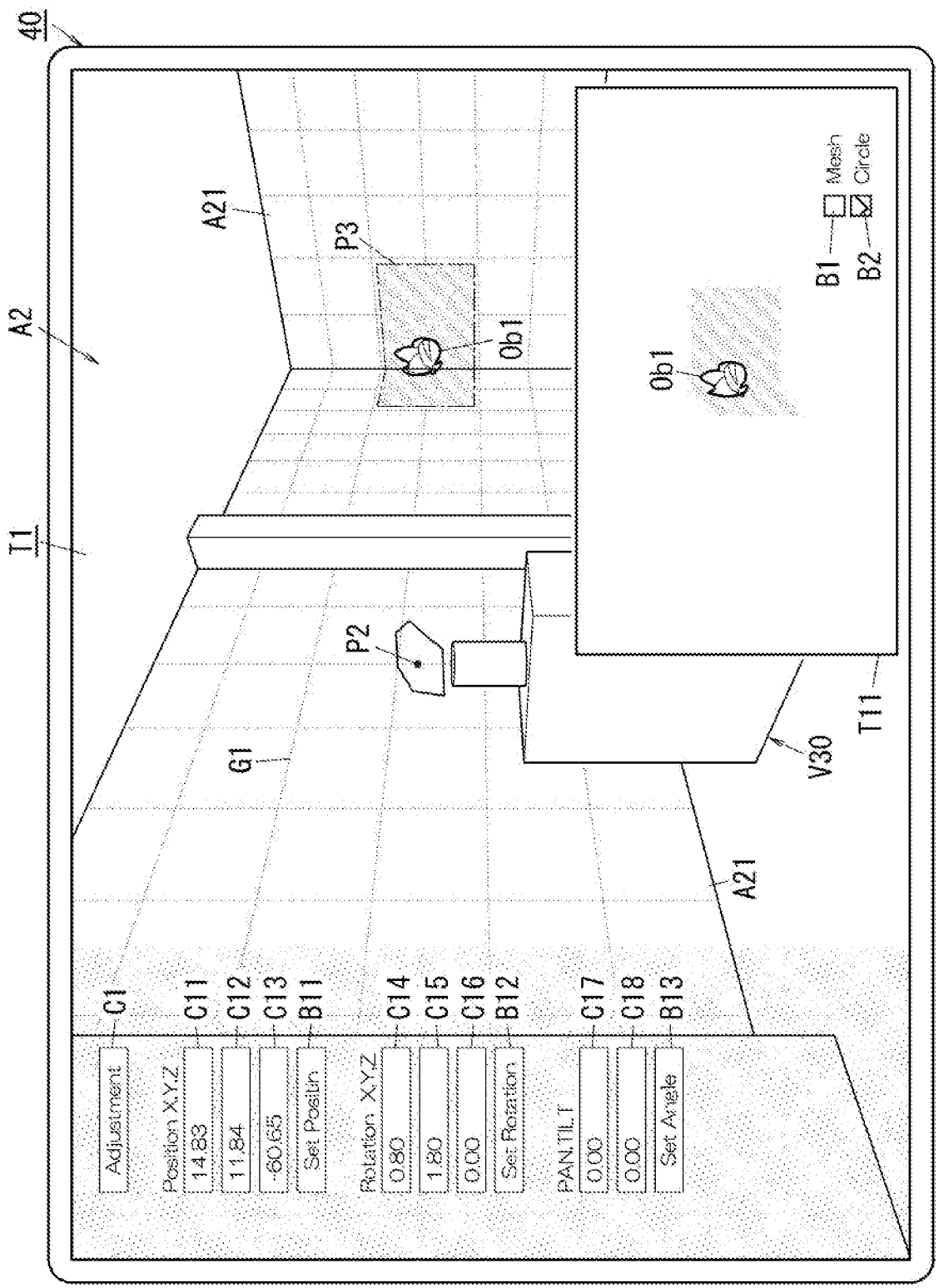
FIG. 6 is an explanatory view illustrating an example of an input support tool screen provided by the content generation method described above.

In the present exemplary embodiment, the input support tool is a tool embodied on input support tool screen T1 as illustrated in FIG. 6 and used on the graphical user interface of the computer system, and is not associated with an entity. FIGS. 6 to 11 illustrate specific examples of a screen displayed on display device 40. A one dotted chain line indicating a region, a reference sign, and a lead line are merely described for description, and the one-dot chain line, the reference sign, and the lead line are not actually displayed on display device 40. Further, in the present exemplary embodiment, as an example, input support tool screen T1 is a horizontally long screen whose dimension in a lateral direction (horizontal direction) is larger than a dimension in a vertical direction (perpendicular direction).

The input support tool has two types of modes: an adjustment mode and a creation support mode. FIG. 6 illustrates input support tool screen T1 when the input support tool is in the adjustment mode, and FIGS. 7 to 11 illustrate input support tool screen T1 when the input support tool is in the creation support mode.

First, as described above, the input support tool is a tool for allowing the user to input the display position information in the second acquisition process, and presents at least display position P3 in virtual space A2. Therefore, in the present exemplary embodiment, regardless of whether the input support tool is in the adjustment mode or the creation support mode, display is performed to present display position P3 in virtual space A2, on input support tool screen T1. That is, by viewing input support tool screen T1, the user can grasp where display position P3 is in virtual space A2.

More specifically, for example, as illustrated in FIG. 6, the input support tool presents display position P3 by displaying an image of virtual space A2 in which object Ob1 is displayed at display position P3. That is, in input support tool screen T1, by visualizing virtual space A2 and displaying object Ob1 at display position P3 in virtual space A2, display position P3 in virtual space A2 can be specified. Furthermore, virtual space A2 to be visualized on input support tool screen T1 is reproduced in a state where virtual camera V30 is also visualized.

Further, in the present exemplary embodiment, the input support tool displays, as reference screen T11, a rendered image of object Ob1 that is displayed at display position P3 and viewed from reference position P2 when object Ob1 is displayed at display position P3 in virtual space A2. That is, on input support tool screen T1, a rendered image corresponding to image content D1 generated by generation unit 14 is displayed as reference screen T11. In the present exemplary embodiment, in the generation process, by using virtual camera V30, there is generated, as image content D1, an image including object Ob1 viewed from reference position P2 when object Ob1 is displayed at display position P3 in virtual space A2. Therefore, reference screen T11 is a rendered image virtually captured by virtual camera V30 and generated (rendered) by arithmetic processing.

In the present exemplary embodiment, as an example, reference screen T11 is superimposed and displayed on a part of input support tool screen T1 in a picture-in-picture (PIP) manner. Therefore, according to input support tool screen T1, the user can simultaneously view the visualized virtual space A2 and the rendered image (reference screen T11) corresponding to generated image content D1. By displaying such reference screen T11, the user can easily envision generated image content D1.

Furthermore, in the present exemplary embodiment, as an example, in virtual space A2 to be visualized on input support tool screen T1, grid G1 is displayed on virtual projection surface A21 corresponding to projection surface A11 (wall surface) in real space A1.

Furthermore, in the examples of FIGS. 6 to 11, a portion to be a background of object Ob1, that is, a portion inside display position P3 and displayed in black other than object Ob1 is shaded (dot hatched).

Whereas, since all the regions other than object Ob1 are displayed in black in the image projected from projector 30, originally, all the regions other than object Ob1 are displayed in black also on reference screen T11. For example, in reference screen T11 of FIG. 6, all of a shaded (dot hatched) region and a white region outside the shaded region other than object Ob1 are originally displayed in black. Such an image can be generated, for example, by setting only object Ob1 as a rendering target and excluding other than object Ob1 from the rendering target. Image content D1 to be recorded (written) in data storage 22 can be generated in this manner.

However, while the user performs various operations on input support tool screen T1, grid G1, virtual camera V30 imitating projector 30, a peripheral edge of virtual mirror unit V32, and the like are also preferably included in the rendering target and displayed on reference screen T11. This allows the user to easily perform confirmation of a projection position, checking vignetting, and the like, on input support tool screen T1. For example, when grid G1 is displayed on reference screen T11, the user can easily confirm a position, a rotation state, and the like of object Ob1 with respect to virtual space A2, on input support tool screen T1. Therefore, in reference screen T11 in the examples of FIGS. 7 to 11, grid G1, virtual camera V30, the peripheral edge of virtual mirror unit V32, and the like are also included in the rendering target.

Furthermore, as described above, grid G1, virtual camera V30, the peripheral edge of virtual mirror unit V32, and the like that can be rendering targets may be projected in real space A1 together with object Ob1, by projector 30. That is, for example, when grid G1 is projected in real space A1 by projector 30, it becomes easy to confirm the projection position of image content D1 in real space A1 by using grid G1 as a guide. As an example, by projecting grid G1, it becomes easy to check how much a corner of a room on real space A1 matches a corner of a room on image content D1 to be projected by projector 30.

Further, when virtual camera V30 or the peripheral edge of virtual mirror unit V32 is projected in real space A1 by projector 30, the user can visually confirm that vignetting actually occurs at projector 30 or the peripheral edge of mirror unit 32 existing in real space A1. Further, when virtual camera V30 is projected in real space A1 by projector 30, virtual camera V30 is mapped on projector 30 existing in real space A1, which makes it easy to confirm the projection position in real space A1 from mapping deviation. Similarly, when the peripheral edge of virtual mirror unit V32 is projected in real space A1 by projector 30, the peripheral edge of virtual mirror unit V32 is mapped on the peripheral edge of mirror unit 32 existing in real space A1, which makes it easy to confirm the projection position in real space A1 from the mapping deviation.

Further, input support tool screen T1 may include a part (a check box, a button, or the like) for reception of a user's operation for switching whether or not to set grid G1, virtual camera V30, the peripheral edge of virtual mirror unit V32, and the like, as a rendering target.

Hereinafter, a description is given to a detailed configuration of input support tool screen T1 when the input support tool is in each of the adjustment mode and the creation support mode. In the following description, an operation of button B11 or the like means an operation of button B11 or the like displayed on input support tool screen T1, and specifically means that the user selects button B11 or the like in input support tool screen T1 by using input device 50.

First, when the input support tool is in the adjustment mode, as illustrated in FIG. 6, title field C1, a plurality of input fields C11 to C18, and a plurality of buttons B11 to B13 are displayed at a left end of input support tool screen T1. In title field C1, a character string "Adjustment" indicating the mode of the input support tool is displayed.

The plurality of input fields C11 to C13 are used for adjusting an overall position of virtual camera V30. That is, into input field C11, input field C12, and input field C13, coordinate values of the X axis, the Y axis, and the Z axis in virtual space A2 expressed in the XYZ orthogonal coordinate system are individually inputted by the user. That is, information inputted into the plurality of input fields C11 to C13 corresponds to reference position information for specifying reference position P2 where virtual camera V30 is installed. When button B11 is operated in a state where values are inputted in the plurality of input fields C11 to C13, content generation system 10 arranges virtual camera V30 at reference position P2 specified by the inputted value.

The plurality of input fields C14 to C16 are used for adjusting an overall orientation of virtual camera V30. That is, into input field C14, input field C15, and input field C16, rotation amounts about the X axis, the Y axis, and the Z axis in virtual space A2 expressed in the XYZ orthogonal coordinate system are individually inputted by the user. When button B12 is operated in a state where values are inputted in the plurality of input fields C14 to C16, content generation system 10 rotates virtual camera V30 by the rotation amount specified by the inputted value.

Here, in adjusting the overall position and orientation of virtual camera V30, the input support tool preferably executes the following processing. For example, the input support tool performs display for confirming a field of view of virtual camera V30 on input support tool screen T1, in a state where virtual camera V30 is installed in virtual space A2. At this time, input support tool screen T1 displays, as the field of view of virtual camera V30, for example, a region surrounded by a trajectory of an optical axis (center of the field of view) of virtual camera V30, when virtual mirror unit V32 is driven along four sides of a movable region. Therefore, while confirming such a field of view of virtual camera V30 on input support tool screen T1, the user can designate an appropriate overall position and orientation of virtual camera V30.

The plurality of input fields C17 and C18 are used for adjusting a relative orientation (angle) of virtual mirror unit V32 of virtual camera V30 with respect to virtual image-capturing unit V31. That is, into input field C17 and input field C18, rotation amounts of virtual mirror unit V32 in the panning operation direction and the tilt operation direction are individually inputted by the user. When button B13 is operated in a state where values are inputted in the plurality of input fields C17 and C18, content generation system 10 rotates virtual mirror unit V32 by the rotation amount specified by the inputted value, with respect to virtual image-capturing unit V31.

Therefore, since the optical axis (center of the field of view) of virtual camera V30 is specified by combining the information inputted into the plurality of input fields C11 to C18, the information inputted into the plurality of input fields C11 to C18 corresponds to the display position information for specifying display position P3. That is, when the input support tool is in the adjustment mode, display position P3 where object Ob1 is displayed is determined by the information inputted into the plurality of input fields C11 to C18. In the example of FIG. 6, at a corner formed by two virtual projection surfaces A21 orthogonal to each other, display position P3 is set to straddle the two virtual projection surfaces A21, and object Ob1 is displayed at display position P3.

In addition, two check boxes B1 and B2 are displayed in reference screen T11. Each of check boxes B1 and B2 is checked and unchecked in every operation by the user.

Check box B1 with a character string "Mesh" is used to switch between display and non-display of grid G1 on reference screen T11. When check box B1 is checked, grid G1 is displayed on reference screen T11, and when check box B1 is unchecked, grid G1 is not displayed on reference screen T11. Check box B2 with a character string "Circle" is used to switch between display and non-display of rotation region R2 (see FIG. 11) on reference screen T11. When check box B2 is checked, rotation region R2 is displayed on reference screen T11, and when check box B1 is unchecked, rotation region R2 is not displayed on reference screen T11. Rotation region R2 indicates a range in which a size of object Ob1 does not change even when object Ob1 rotates.

Figure 7:
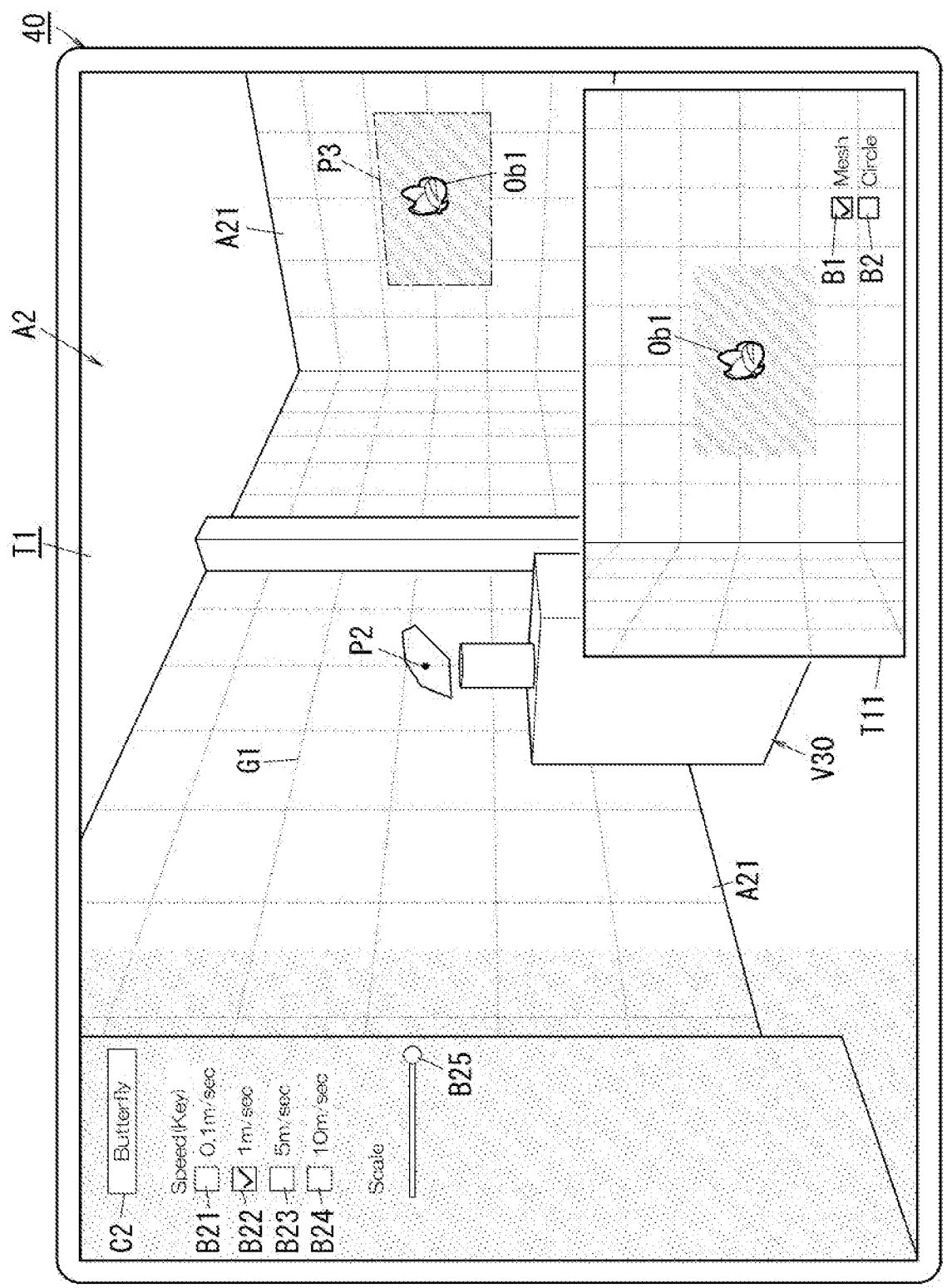
FIG. 7 is an explanatory view illustrating an example of the input support tool screen provided by the content generation method described above.

Next, when the input support tool is in the creation support mode, as illustrated in FIG. 7, title field C2, a plurality of check boxes B21 to B24, and slide bar B25 are displayed at a left end of input support tool screen T1. In title field C2, a character string "Butterfly" indicating an object name is displayed.

The plurality of check boxes B21 to B24 are used to set a moving speed of display position P3 (object Ob1) at a time of keyboard operation as input device 50. That is, any one of the plurality of check boxes B21 to B24 respectively given with character strings of "0.1 m/sec", "1 m/sec", "5 m/sec", and "10 m/sec" is alternatively selected, and the moving speed of display position P3 is determined by the selected one of check boxes B21 to B24. For example, the moving speed of display position P3 is minimized when check box B21 of "0.1 m/sec" is selected, while the moving speed of display position P3 is maximized when check box B24 of "10 m/sec" is selected. Each of check boxes B21 to B24 is checked and unchecked in every operation by the user, and the selected one of check boxes B21 to B24 is checked.

Slide bar B25 is used to adjust a size of object Ob1. That is, the size of object Ob1 displayed at display position P3 can be adjusted by operating slide bar B25. Here, as an example, the size of object Ob1 increases as slide bar B25 goes to a right side.

Further, check boxes B1 and B2 in reference screen T11 are similar to input support tool screen T1 (see FIG. 6) when the input support tool is in the adjustment mode.

Further, when the input support tool is in the creation support mode, the user designates any position in virtual space A2 by operating input device 50, to designate this position as display position P3. For example, when a cursor is moved on input support tool screen T1 by an operation of a pointing device or a keyboard included in input device 50, display position P3 is set at a position overlapping with the cursor on virtual projection surface A21.

Therefore, for example, the display position information is sequentially inputted by moving a pointing device such as a mouse, and movement of display position P3 is realized in real time in accordance with the movement of the pointing device. As an example, when an operation such as dragging of object Ob1 is performed with a pointing such as a mouse, in conjunction with this operation, object Ob1 and display position P3 move in real time in virtual space A2 displayed on input support tool screen T1.

Here, content generation system 10 automatically controls, by generation unit 14, virtual camera V30 such that a representative point of object Ob1 set as the tracking object is positioned on an optical axis (center of the field of view) of virtual camera V30. Therefore, when object Ob1 moves in virtual space A2 as described above, virtual mirror unit V32 swing in conjunction with this, and virtual mirror unit V32 swings also in virtual camera V30 displayed on input support tool screen T1.

Figure 8:
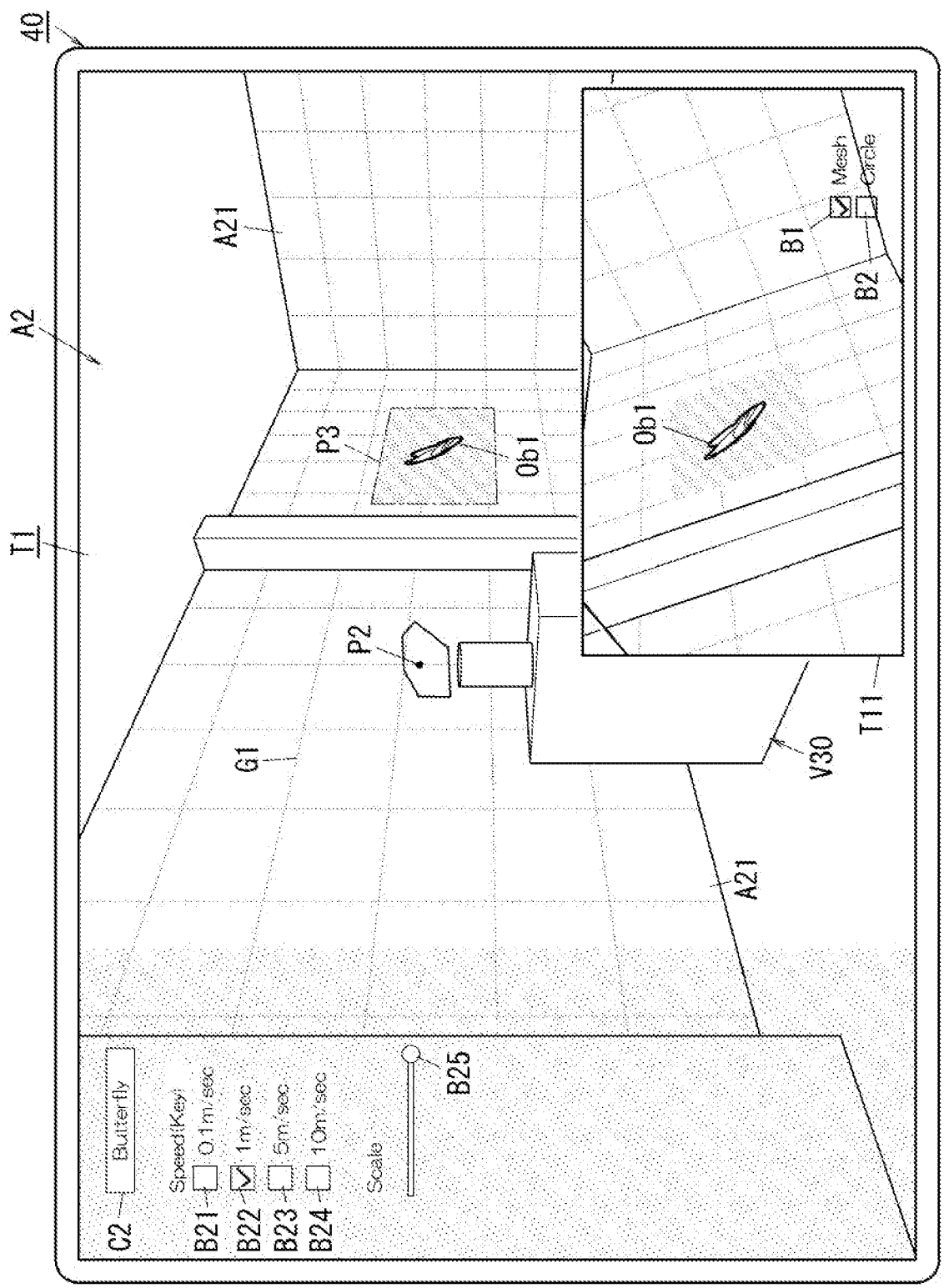
FIG. 8 is an explanatory view illustrating an example of the input support tool screen provided by the content generation method described above.

For example, input support tool screen T1 illustrated in FIG. 8 represents input support tool screen T1 when object Ob1 is moved toward left in virtual space A2, from the state of FIG. 7. Therefore, when the state of FIG. 7 is shifted to the state of FIG. 8, virtual mirror unit V32 of virtual camera V30 performs the panning operation. Therefore, when the state of FIG. 7 is shifted to the state of FIG. 8, object Ob1 in reference screen T11 corresponding to image content D1 rotates counterclockwise.

Figure 9:
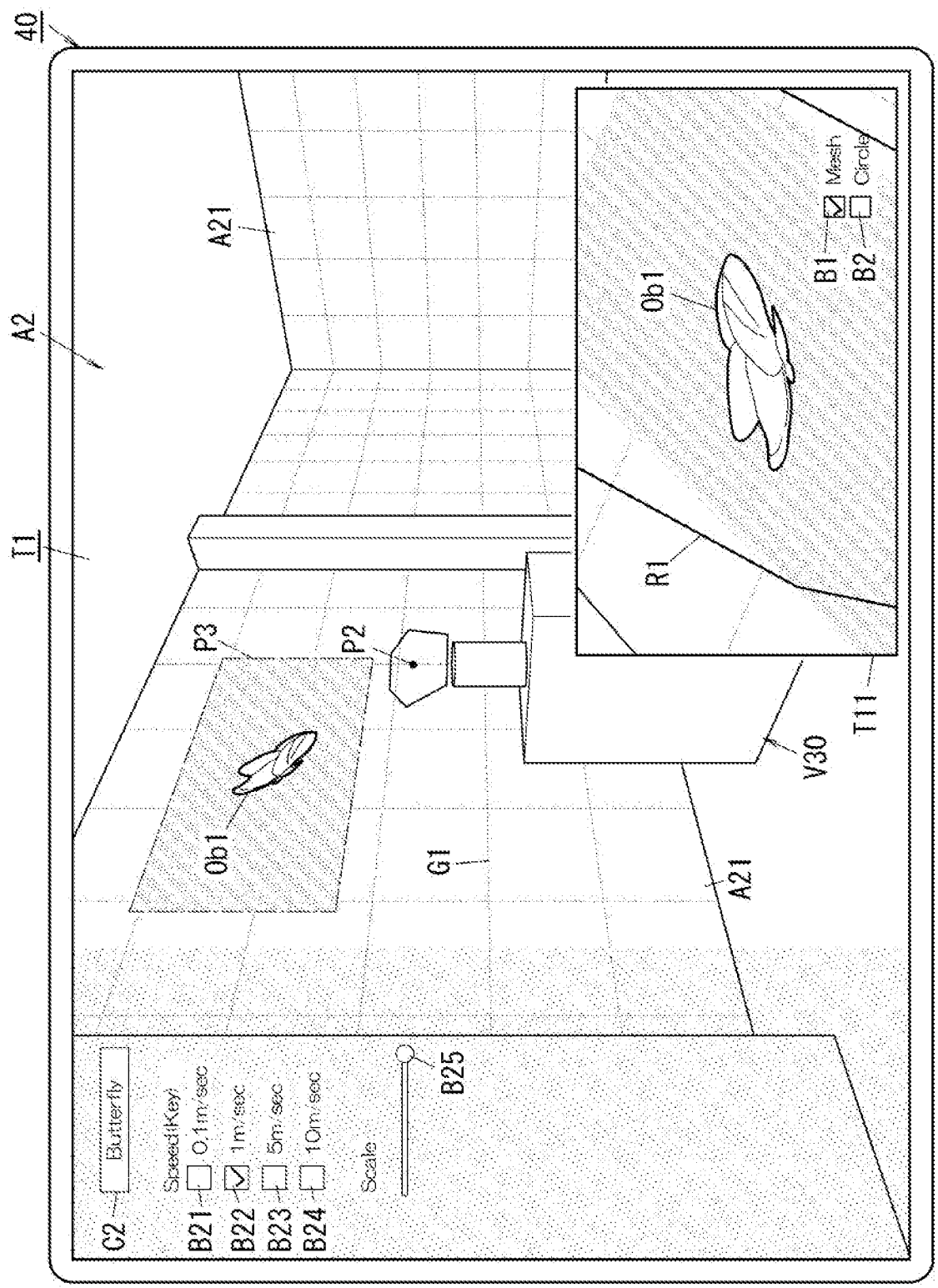
FIG. 9 is an explanatory view illustrating an example of the input support tool screen provided by the content generation method described above.

In addition, input support tool screen T1 illustrated in FIG. 9 represents input support tool screen T1 when object Ob1 is moved toward upper left on virtual projection surface A21 in virtual space A2, from the state of FIG. 8. Therefore, when the state of FIG. 8 is shifted to the state of FIG. 9, virtual mirror unit V32 of virtual camera V30 simultaneously performs the panning operation and the tilt operation. Therefore, when the state of FIG. 8 is shifted to the state of FIG. 9, object Ob1 in reference screen T11 corresponding to image content D1 rotates counterclockwise.

Here, as illustrated in FIG. 9, on reference screen T11, guide range R1 corresponding to an outer peripheral edge of virtual mirror unit V32 is displayed. That is, in virtual camera V30, depending on a rotation angle of virtual mirror unit V32, for example, the field of view of virtual camera V30 may protrude from virtual mirror unit V32 to cause vignetting, and object Ob1 may not fall within the field of view of virtual camera V30. If object Ob1 does not fall within the field of view of virtual camera V30, a chip or the like may occur in object Ob1 captured by virtual camera V30. Then, in such a region where vignetting occurs in virtual camera V30, similar vignetting may occur in moving mirror type projector 30. Therefore, on reference screen T11, by displaying such a region where vignetting may occur, that is, the outside of virtual mirror unit V32 as guide range R1, a range in which object Ob1 can be displayed without vignetting being caused is presented to the user.

In short, in the present exemplary embodiment, guide range R1 as a guide of a range in which object Ob1 can be displayed is defined in virtual space A2. Such guide range R1 is not limited to being displayed on reference screen T11, and may be displayed, for example, on virtual space A2 visualized on input support tool screen T1. Furthermore, vignetting may occur not only outside virtual mirror unit V32 but also, for example, when a main body of virtual image-capturing unit V31 appears. That is, in projector 30, vignetting may occur also when projected light hits the main body of projection unit 31. By defining, as guide range R1, a range of vignetting or the like that may occur due to such various factors, the user can use as a guide of a range in which object Ob1 can be displayed without a chip on virtual space A2.

Figure 10:
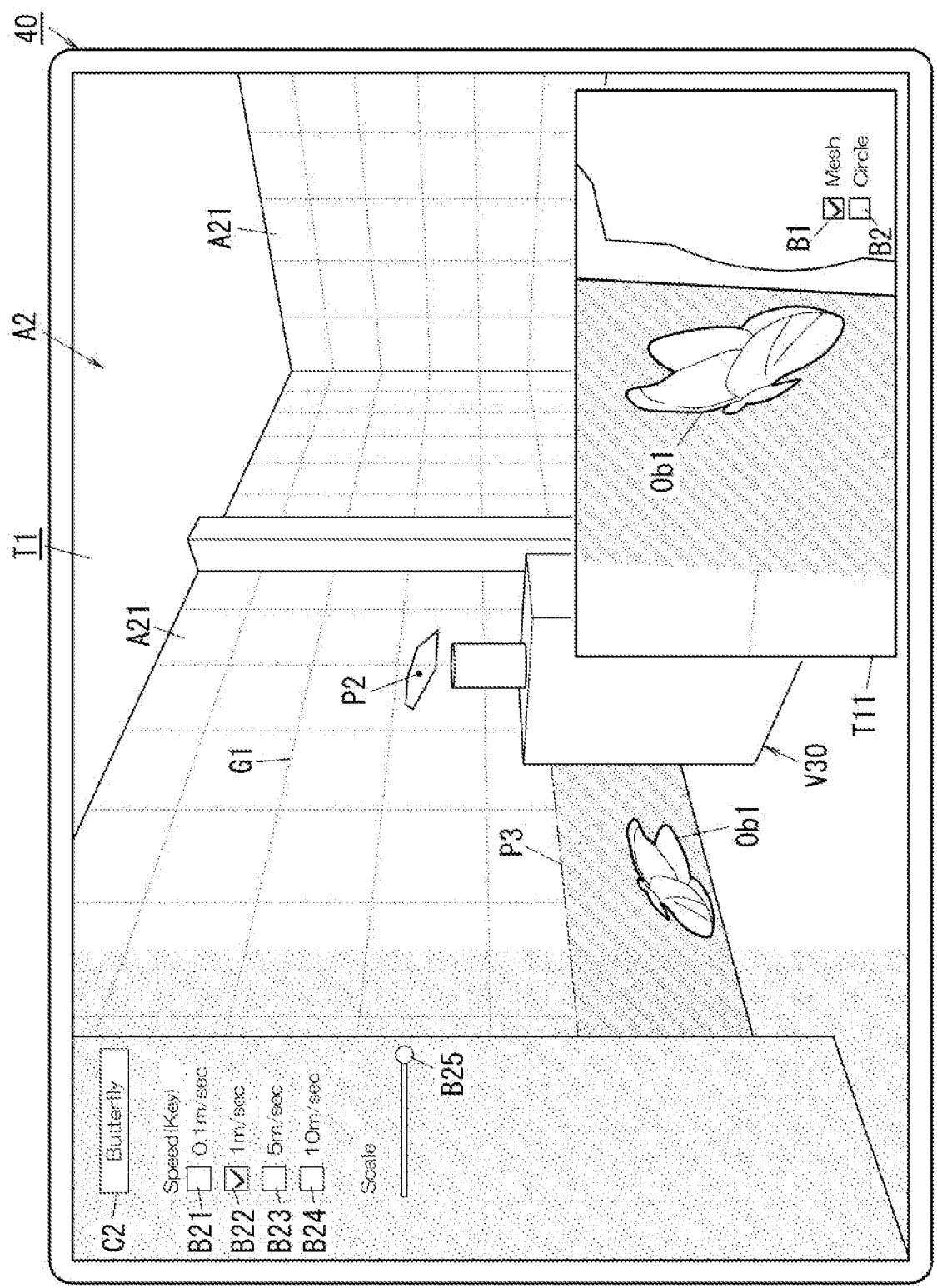
FIG. 10 is an explanatory view illustrating an example of the input support tool screen provided by the content generation method described above.

Further, input support tool screen T1 illustrated in FIG. 10 represents input support tool screen T1 when object Ob1 is moved downward on virtual projection surface A21 in virtual space A2, from the state of FIG. 9. Therefore, when the state of FIG. 9 is shifted to the state of FIG. 10, virtual mirror unit V32 of virtual camera V30 performs the tilt operation. Then, in the example of FIG. 10, vignetting occurs since the main body of virtual image-capturing unit V31 appears in a right half of reference screen T11. That is, a region in which the main body of virtual image-capturing unit V31 appears corresponds to the outside of guide range R1 (see FIG. 9).

Figure 11:
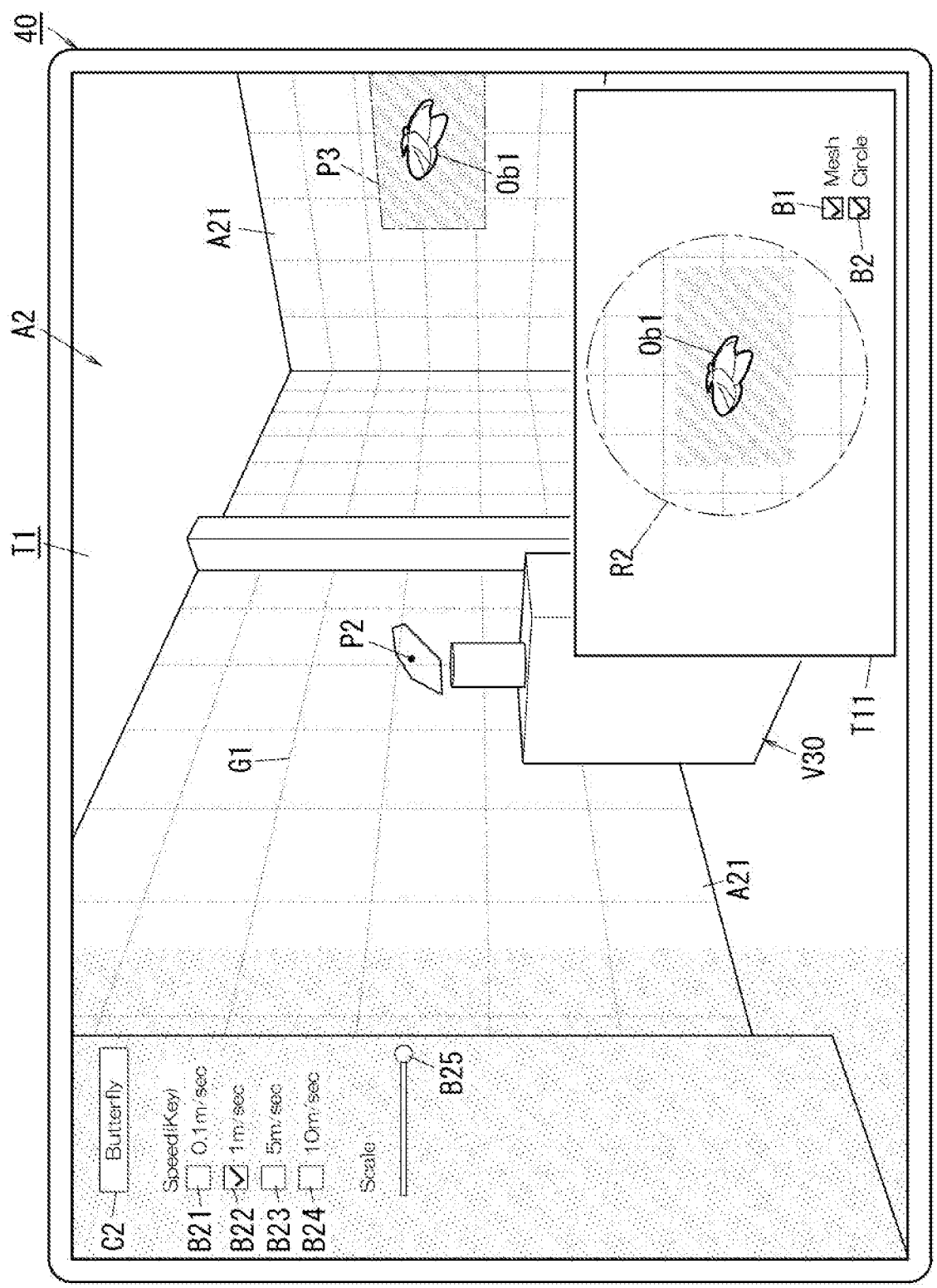
FIG. 11 is an explanatory view illustrating an example of the input support tool screen provided by the content generation method described above.

In addition, input support tool screen T1 illustrated in FIG. 11 represents input support tool screen T1 when object Ob1 is greatly moved rightward on virtual space A2, from the state of FIG. 10. Therefore, when the state of FIG. 10 is shifted to the state of FIG. 11, virtual mirror unit V32 of virtual camera V30 performs the panning operation. Then, in the example of FIG. 11, check box B2 of reference screen T11 is checked, and rotation region R2 is displayed on reference screen T11.

By using the input support tool as described above, the user can designate display position P3 relatively easily, and can generate image content D1 for projecting object Ob1 at projection position P1 corresponding to this display position P3. Further, the user can also relatively easily generate image content D1 when display position P3 corresponding to projection position P1 is moved.

Furthermore, similarly to the designation of display position P3 as described above, in the input support tool, the user may be able to designate a parameter for control, such as a shutter of projector 30. The parameter designated by the user in this way is also preferably included in control information D2 as long as the parameter is related to the control of projector 30.

(5) Content Projection Method

Next, a description is given to an operation in the reproduction mode of content generation system 10 according to the present exemplary embodiment, that is, the content projection method according to the present exemplary embodiment.

In the content projection method according to the present exemplary embodiment, image content D1 generated by the content generation method is projected at projection position P1 in real space A1 by projector 30. Therefore, it is necessary to install projector 30 at installation position P4 in real space A1, as preparation. Here, since installation position P4 is a position corresponding to reference position P2 in virtual space A2 in which virtual camera V30 is installed, the user installs projector 30 at installation position P4 corresponding to reference position P2 used in the content generation method.

Further, the content projection method according to the present exemplary embodiment further has a correction process of correcting at least one of an installation state of projector 30 or control information D2 of projector 30, in accordance with a parameter used in the generation process. The "installation state" mentioned here may include both a position and an orientation of projector 30. In the present exemplary embodiment, in the generation process of the content generation method, adjustment of the overall position of virtual camera V30 and adjustment of the overall orientation of virtual camera V30 are performed on input support tool screen T1 when the input support tool is in the adjustment mode. Therefore, parameters regarding the position and the orientation of virtual camera V30 used when the input support tool is in the adjustment mode are used to correct the installation state of projector 30. This enables correction (fine adjustment) of the position and the orientation of projector 30 in real space A1, according to the position and the orientation of virtual camera V30 in virtual space A2. Conversely, it is also possible to correct (finely adjust) the position and the orientation of virtual camera V30 in virtual space A2 in accordance with the installation state (the position and the orientation) of projector 30 in real space A1.

As described above, projector 30 installed at installation position P4 is wire-connected to content generation system 10 through video cable 101, control cable 102, and communication cable 103.

In the content projection method according to the present exemplary embodiment, content generation system 10 reproduces image content D1 and outputs (transmits) a video signal to projector 30, and projector 30 projects image content D1. At this time, since the operation mode of content generation system 10 is the reproduction mode, content generation system 10 reproduces image content D1 stored in data storage 22, and outputs (transmits) a video signal to projector 30. Image content D1 reproduced here is image content D1 generated by the content generation method according to the present exemplary embodiment. That is, the content projection method includes a projection process of projecting image content D1 generated by the content generation method, at projection position P1 in real space A1 by projector 30. Since image content D1 is an image of object Ob1 excluding the background of object Ob1 in virtual space A2, projector 30 can project only object Ob1.

Furthermore, in the projection process, control information D2 is also transmitted from content generation system 10 to projector 30 together with image content D1. Here, image content D1 and control information D2 are inputted to projector 30 in a synchronized state. Therefore, in projector 30, drive unit 33 can drive mirror unit 32 in accordance with control information D2 while projecting image content D1. This allows projector 30 to move projection position P1 on real space A1, and to reproduce movement of object Ob1 when image content D1 is generated in virtual space A2.

Projection image Im1 projected by the image projection method described above is displayed, in real space A1, at projection position P1 corresponding to display position P3 in virtual space A2. Moreover, when projector 30 projects image content D1 at projection position P1, object Ob1 to be projected substantially coincide with object Ob1 virtually displayed at display position P3. Therefore, in real space A1, object Ob1 virtually displayed in virtual space A2 is projected as projection image Im1 as if virtual space A2 has been copied. Further, for image content D1 generated while display position P3 is being moved in virtual space A2, projection position P1 can be moved in the same manner in real space A1.

(6) Modifications

The first exemplary embodiment is merely one of various exemplary embodiments of the present disclosure. The first exemplary embodiment can be variously changed in accordance with design and the like, as long as the object of the present disclosure can be achieved. Each drawing described in the present disclosure is a schematic view, and a ratio of a size and a thickness of each component in each drawing does not necessarily reflect an actual dimensional ratio. Further, functions similar to those of content generation system 10 according to the first exemplary embodiment may be embodied by a content generation method, a computer program, a non-transitory recording medium in which the computer program is recorded, or the like. Functions similar to those of image projection system 100 according to the first exemplary embodiment may be embodied by an image projection method, a computer program, a non-transitory recording medium in which the computer program is recorded, or the like.

Hereinafter, modifications of the first exemplary embodiment will be listed. The modifications described below can be appropriately combined and applied.

Content generation system 10 in the present disclosure includes a computer system. The computer system includes a processor and a memory as hardware, as a main configuration. By the processor executing a program recorded in the memory of the computer system, a function as content generation system 10 in the present disclosure is realized. The program may be pre-recorded in a memory of the computer system, may be provided through a telecommunication line, or may be provided by being recorded in a non-transitory recording medium such as a memory card, an optical disk, or a hard disk drive that are readable by the computer system. The processor of the computer system includes one or a plurality of electronic circuits including a semiconductor integrated circuit (IC) or a large-scale integrated circuit (LSI). The integrated circuit such as the IC or the LSI mentioned here is called differently depending on a degree of integration, and includes an integrated circuit called a system LSI, a very large scale integration (VLSI), or an ultra large scale integration (ULSI). Further, a field-programmable gate array (FPGA) programmed after manufacturing of the LSI, or a logic device capable of reconfiguring a bonding relationship inside the LSI or reconfiguring a circuit section inside the LSI can also be employed as the processor. The plurality of electronic circuits may be aggregated into one chip, or may be provided to a plurality of chips in a distributed manner. The plurality of chips may be aggregated in one device, or may be provided to a plurality of devices in a distributed manner. The computer system mentioned here includes a microcontroller having one or more processors and one or more memories. Therefore, the microcontroller is also configured by one or a plurality of electronic circuits including a semiconductor integrated circuit or a large-scale integrated circuit.

Further, aggregating at least some functions of content generation system 10 in one housing is not an essential configuration of content generation system 10, and components of content generation system 10 may be provided in a plurality of housings in a distributed manner. For example, at least some functions of content generation system 10 may be provided in another housing. Further, at least some functions of content generation system 10 may be implemented by cloud (cloud computing), edge (edge computing), or a combination thereof.

Conversely, in the first exemplary embodiment, at least some functions distributed in a plurality of devices may be aggregated in one housing. For example, functions distributed to content generation system 10 and projector 30 may be aggregated in one housing.

In the first exemplary embodiment, content generation system 10 does not include projector 30, display device 40, and input device 50 as components, but at least one of projector 30, display device 40, or input device 50 may be included in components of content generation system 10.

Further, when moving display position P3, it is not essential to accept an input of the display position information by the user at any time on the input support tool as in the first exemplary embodiment.

As an example, in the content generation method, a scenario created by the user may be acquired, and object Ob1 may be moved along the scenario. The "scenario" mentioned here is realized by a command or the like that defines movement of object Ob1. When creating the scenario, it is preferable to notify the user in a case where a field of view of virtual camera V30 protrudes from virtual mirror unit V32 and vignetting may occur.

As another example, in the content generation method, a detection result of a sensor device such as a human sensor or a camera (image sensor) may be acquired, and object Ob1 may be moved in accordance with the detection result. As a result, in the content generation method, it is possible to move the position of object Ob1 in real time in accordance with, for example, a position or the like of a person who is a detection target of the sensor device.

Furthermore, an execution procedure (order) of the plurality of processes in the content generation method is not limited to the order described in the first exemplary embodiment, and can be changed as appropriate. For example, the first acquisition process, the second acquisition process, and the third acquisition process may be executed in the order of the first acquisition process, the third acquisition process, and the second acquisition process, without limiting to the order of the first acquisition process, the second acquisition process, and the third acquisition process.

Furthermore, the communication method between content generation system 10 and projector 30 is not limited to the method exemplified in the first exemplary embodiment, and may be other wired communication, wireless communication, or a hybrid of wired communication and wireless communication. Furthermore, the fact that content generation system 10 and projector 30 can communicate with each other is not an essential configuration in content generation system 10. For example, content generation system 10 may record generated image content D1 onto a recording medium such as a memory card, and projector 30 may reproduce image content D1 recorded on the recording medium. This allows projector 30 to project image content D1 generated by content generation system 10, without communication between content generation system 10 and projector 30.

Furthermore, projector 30 is not limited to the floor-mounted type, and may be attached to, for example, a ceiling, a wall, or the like. Furthermore, the fact that a height of projector 30 is adjustable is not essential for the content generation method, and a height of projector 30 from the floor surface may be fixed.

Furthermore, projector 30 is not limited to the moving mirror type projection system, and for example, may have a configuration in which projection unit 31 moves (including rotation), or may have a configuration in which entire projector 30 moves (including rotation). In either case, projection position P1 can be moved by changing an irradiation position of light from projector 30.

Furthermore, projector 30 is not limited to a movable projection system in which projection position P1 in real space A1 is variable, and may be a fixed projection system in which projection position P1 is fixed. Also in this case, the content generation method, the content projection method, the program, and content generation system 10 according to the present exemplary embodiment are useful. If projector 30 is the fixed projection system, virtual camera V30 may also be a fixed camera system.

Furthermore, content generation system 10 does not necessarily include virtual space formation unit 15, object acquisition unit 16, control information generation unit 17, provision unit 18, input unit 19, output unit 20, communication unit 21, and data storage 22. That is, at least one of virtual space formation unit 15, object acquisition unit 16, control information generation unit 17, provision unit 18, input unit 19, output unit 20, communication unit 21, or data storage 22 may be omitted as appropriate.

In addition, in the content generation method, it is not essential to record (write) generated image content D1 onto data storage 22. For example, in the content generation method, generated image content D1 may be transmitted to projector 30 in real time.

Furthermore, in the content generation method, it is not essential to use virtual camera V30 for generation of image content D1. That is, in the generation process, it is sufficient to generate, as image content D1, an image including object Ob1 viewed from reference position P2 when object Ob1 is displayed at display position P3 in virtual space A2, based on the space information, the reference position information, and the display position information. In such a generation process, virtual camera V30 is not essential.

In addition, the input support tool only needs to be able to present display position P3, and it is not essential to display an image of virtual space A2 in which object Ob1 is displayed at display position P3. As an example, the input support tool may present (display) display position P3 in virtual space A2 by a method of highlighting or the like in virtual space A2 in plan view. As another example, the input support tool may present (display) display position P3 by a coordinate position of virtual space A2 expressed in the XYZ orthogonal coordinate system.

In addition, displaying reference screen T11 is not an essential configuration for the input support tool, and the input support tool may not have the function of displaying the rendered image of object Ob1 as in reference screen T11.

In addition, input support tool screen T1 is not limited to a horizontally long screen, and may be, for example, a vertically long screen in which a dimension in the lateral direction (horizontal direction) is smaller than a dimension in the vertical direction (perpendicular direction). In input support tool screen T1, it is not essential to display reference screen T11 in a picture-in-picture manner, and for example, reference screen T11 may be displayed by switching.

In addition, when an overall position and orientation of virtual camera V30 is adjusted, it is not essential for the input support tool to perform display for confirming the field of view of virtual camera V30 on input support tool screen T1. As an example, in the content generation method, a recommended overall position and orientation of virtual camera V30 may be proposed based on a layout of structures such as a wall, a floor, and a ceiling in virtual space A2. That is, in the content generation method, the recommended position and orientation of virtual camera V30 may be calculated such that a surface (virtual projection surface A21) of the structure in virtual space A2 is included in the field of view of virtual camera V30, and presented to the user. As another example, in the content generation method, by the user designating a desired area in which object Ob1 is desired to be displayed (projected), the overall position and orientation of virtual camera V30 recommended in accordance with the desired region may be proposed. That is, in the content generation method, the recommended position and orientation of virtual camera V30 may be calculated such that a desired range is included in the field of view of virtual camera V30, and presented to the user.

Furthermore, in the content projection method, the user may be able to designate object Ob1 to be projected. In this case, in addition to object Ob1 designated as a tracking object, projector 30 may also project another object Ob1. Furthermore, in the content projection method, a plurality of objects Ob1 may be simultaneously projected. In a case where object Ob1 designated as the tracking object and another other object Ob1 are simultaneously projected, according to the content projection method, object Ob1 that moves in real space A1 and object Ob1 that does not move are to be simultaneously projected.

Furthermore, a plurality of virtual cameras V30 may be installed in virtual space A2. In this case, image content D1 can be generated by each of the plurality of virtual cameras V30. Here, object Ob1 captured (generated) by the plurality of virtual cameras V30 may be a common object Ob1 or may be separate objects Ob1. In either case, in the content projection method, image content D1 is projected by the plurality of projectors 30 corresponding to the plurality of virtual cameras V30.

Second Exemplary Embodiment

Figure 12:
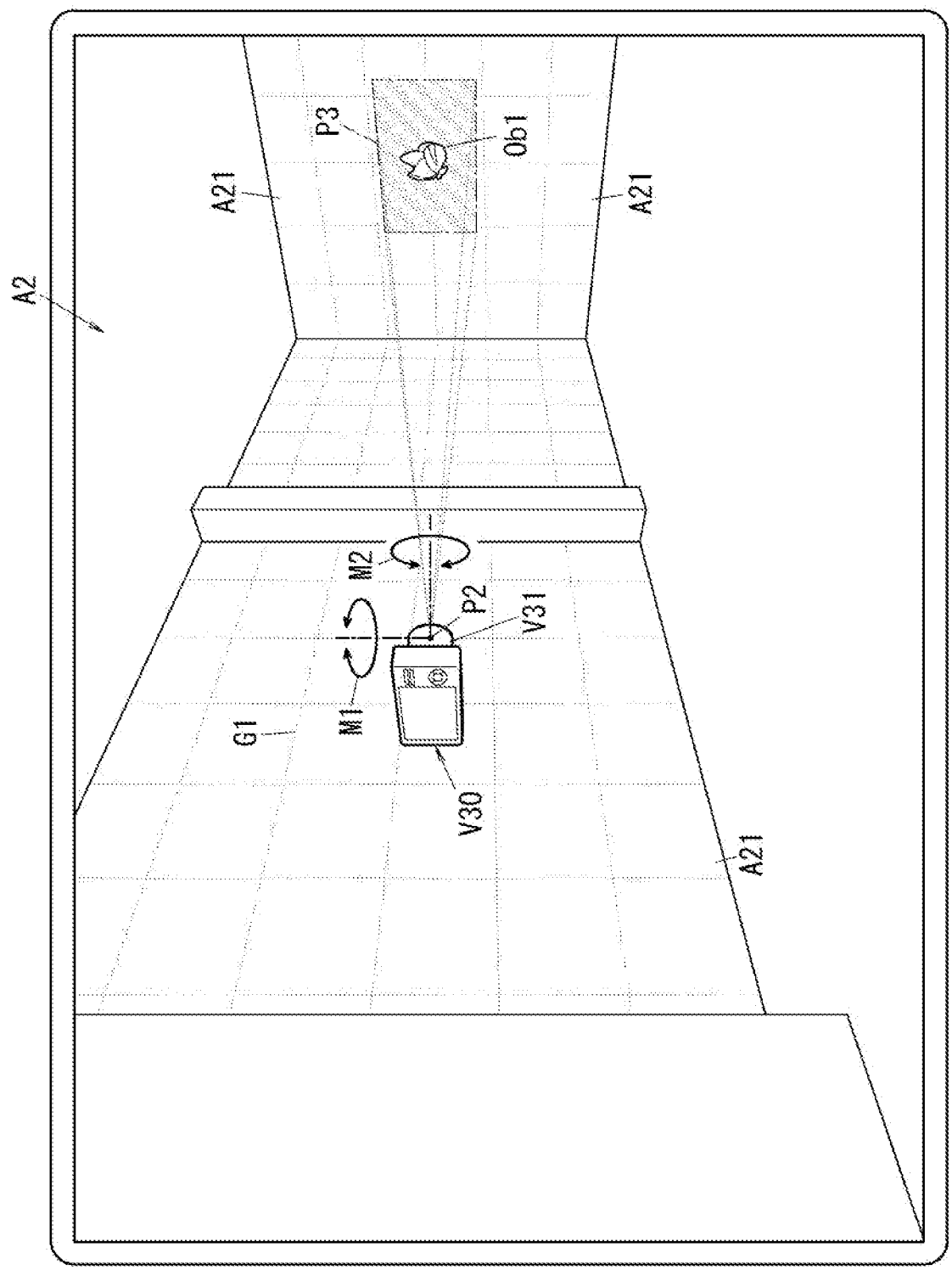
FIG. 12 is an explanatory view of a virtual space formed by a content generation method according to a second exemplary embodiment.

A content generation method according to the present exemplary embodiment is different from the content generation method of the first exemplary embodiment in that virtual camera V30 is not a moving mirror type but the entire virtual camera V30 moves (including rotation), as illustrated in FIG. 12. Hereinafter, the similar configurations to those of the first exemplary embodiment are denoted by the same reference numerals, and the description thereof will be appropriately omitted.

That is, in the present exemplary embodiment, virtual camera V30 does not include virtual mirror unit V32 (see FIG. 3C), and has a configuration in which the entire virtual camera V30 including virtual image-capturing unit V31 moves (including rotation). In FIG. 12, a moving (rotation) direction of virtual camera V30 during a panning operation is indicated by arrow M1, and a moving (rotation) direction of virtual camera V30 during a tilt operation is indicated by arrow M2. An intersection between a rotation axis of the panning operation and a rotation axis of the tilt operation is located, for example, at a lens center of virtual image-capturing unit V31.

Also in the present exemplary embodiment, a case is assumed in which projector 30 that projects generated image content D1 is a moving mirror type projection system. Therefore, in the present exemplary embodiment, in a generation process, it is preferable to change an orientation of object Ob1 in image content D1 in accordance with a position of display position P3 in virtual space A2. That is, in the generation process, by changing the orientation of object Ob1 in image content D1 in accordance with the position of display position P3, image content D1 in which object Ob1 rotates in accordance with projection position P1 is generated. As a method for rotating object Ob1 in image content D1, virtual camera V30 may be rotated about an optical axis, or rotation correction may be applied to object Ob1 captured by virtual camera V30.

Functions similar to those of the content generation method according to a second exemplary embodiment may be embodied by content generation system 10, a computer program, a non-transitory recording medium in which the computer program is recorded, or the like.

As a modification of the second exemplary embodiment, projector 30 is not limited to the moving mirror type projection system, and may have, for example, a configuration in which projection unit 31 moves (including rotation), or a configuration in which entire projector 30 moves (including rotation). With the configuration in which projection unit 31 moves or the configuration in which entire projector 30 moves, the processing of changing an orientation of object Ob1 in image content D1 in accordance with a position of display position P3 can be omitted.

Furthermore, as another modification of the second exemplary embodiment, virtual camera V30 may include virtual mirror unit V32. In this case, for example, virtual mirror unit V32 is to be transparent, and virtual image-capturing unit V31 is located behind virtual mirror unit V32.

Various configurations (including modifications) described in the second exemplary embodiment can be adopted by appropriately combining with various configurations (including modifications) described in the first exemplary embodiment.

SUMMARY

As described above, a content generation method according to a first aspect is a method for generating image content (D1) to be projected by projector (30) at projection position (P1) in real space (A1), and the method includes a first acquisition process, a second acquisition process, a third acquisition process, and a generation process. In the first acquisition process, space information regarding virtual space (A2) corresponding to real space (A1) is acquired. In the second acquisition process, display position information regarding display position (P3) corresponding to projection position (P1) in virtual space (A2) is acquired. In the third acquisition process, reference position information regarding reference position (P2) in virtual space (A2) is acquired. In the generation process, based on the space information, the reference position information, and the display position information, an image including object (Ob1) viewed from reference position (P2) when object (Ob1) is displayed at display position (P3) of virtual space (A2) is generated as image content (D1).

According to this aspect, in virtual space (A2), an image including object (Ob1) viewed from reference position (P2) when object (Ob1) is displayed at display position (P3) is generated as image content (D1). That is, in virtual space (A2), object (Ob1) can be virtually displayed in any size and shape at any display position (P3). For example, when image content (D1) is projected at projection position (P1) by projector (30) located at a position corresponding to reference position (P2) in real space (A1), object (Ob1) to be projected substantially coincide with object (Ob1) displayed at display position (P3). Therefore, by displaying object (Ob1) at display position (P3) in virtual space (A2), it is possible to generate image content (D1) without considering a relative positional relationship between projector (30) and projection position (P1). As a result, there is an advantage that it becomes easy to generate image content (D1) in accordance with the relative positional relationship between projector (30) and projection position (P1), and it becomes possible to more easily generate image content (D1).

In the content generation method according to a second aspect, in the first aspect, projection position (P1) is movable in real space (A1). In the second acquisition process, display position information regarding display position (P3) that moves in virtual space (A2) in accordance with movement of projection position (P1) is acquired.

According to this aspect, image content (D1) suitable for projection at projection position (P1) that moves in real space (A1) can be generated more easily.

In the content generation method according to a third aspect, in the second aspect, projector (30) includes projection unit (31), mirror unit (32), and drive unit (33). Projection unit (31) emits light for projecting projection image (Im1) by using image content (D1). Mirror unit (32) reflects the light emitted from projection unit (31). Drive unit (33) moves projection position (P1) by driving mirror unit (32) so as to change an orientation of mirror unit (32).

According to this aspect, projection position (P1) that moves in real space (A1) can be realized by a moving mirror type projection system.

The content generation method according to a fourth aspect is, in the second or third aspect, in the generation process, an orientation of object (Ob1) in image content (D1) is changed in accordance with a position of display position (P3) in virtual space (A2).

According to this aspect, it is also possible to cope with a change in an orientation of object (Ob1) in image content (D1).

The content generation method according to a fifth aspect is, in any one of the second to fourth aspects, in the generation process, an image that is viewed from reference position (P2) and is of object (Ob1) displayed at display position (P3) that moves in virtual space (A2) is generated as image content (D1) including a moving picture.

According to this aspect, image content (D1) suitable for projection at projection position (P1) that moves in real space (A1) can be generated more easily.

The content generation method according to a sixth aspect further includes a control information generation process, in any one of the second to fifth aspects. In the control information generation process, control information (D2) of projector (30) for movement of projection position (P1) in real space (A1) is generated in synchronization with movement of display position (P3).

According to this aspect, it becomes easy to control projector (30) for movement of projection position (P1) in real space (A1).

In the content generation method according to a seventh aspect, in any one of the first to sixth aspects, image content (D1) is an image of object (Ob1) excluding a background of object (Ob1) in virtual space (A2).

According to this aspect, the processing of removing the background of object (Ob1) in virtual space (A2) becomes unnecessary.

The content generation method according to an eighth aspect further includes a provision process, in any one of the first to seventh aspects. In the provision process, there is provided an input support tool to allow a user to input display position information in the second acquisition process. The input support tool presents at least display position (P3) in virtual space (A2).

According to this aspect, the user can easily input the display position information.

In the content generation method according to a ninth aspect, in the eighth aspect, the input support tool presents display position (P3) by displaying an image of virtual space (A2) in which object (Ob1) is displayed at display position (P3).

According to this aspect, the user can more easily input the display position information.

In the content generation method according to a tenth aspect, in the eighth or ninth aspect, the input support tool displays, as reference screen (T11), a rendered image of object (Ob1) displayed at display position (P3) and viewed from reference position (P2) when object (Ob1) is displayed at display position (P3) in virtual space (A2).

According to this aspect, the user can confirm the rendered image corresponding to image content (D1), when inputting the display position information.

In the content generation method according to an eleventh aspect, in any one of the first to tenth aspects, guide range (R1) serving as a guide of a range in which object (Ob1) can be displayed is defined in virtual space (A2).

According to this aspect, it becomes easy to designate display position (P3) in the range where object (Ob1) can be displayed.

A content projection method according to a twelfth aspect includes a projection process. In the projection process, image content (D1) generated by the content generation method according to any one of the first to eleventh aspects is projected at projection position (P1) in real space (A1) by projector (30).

According to this aspect, there is an advantage that image content (D1) can be generated more easily.

A content projection method according to a thirteenth aspect further includes a correction process, in the twelfth aspect. In the correction process, at least one of an installation state of projector (30) or control information (D2) of projector (30) is corrected in accordance with a parameter used in the generation process.

According to this aspect, installation or the like of projector (30) is simplified.

A program according to a fourteenth aspect is a program for causing one or more processors to execute the content generation method according to any one of the first to eleventh aspects.

According to this aspect, there is an advantage that image content (D1) can be generated more easily.

Content generation system (10) according to a fifteenth aspect is a system for generating image content (D1) to be projected by projector (30) at projection position (P1) in real space (A1), and includes first acquisition unit (11), second acquisition unit (12), third acquisition unit (13), and generation unit (14). First acquisition unit (11) acquires space information regarding virtual space (A2) corresponding to real space (A1). Second acquisition unit (12) acquires display position information regarding display position (P3) corresponding to projection position (P1) in virtual space (A2). Third acquisition unit (13) acquires reference position information regarding reference position (P2) in virtual space (A2). Based on the space information, the reference position information, and the display position information, generation unit (14) generates, as image content (D1), an image including object (Ob1) viewed from reference position (P2) when object (Ob1) is displayed at display position (P3) of virtual space (A2).

According to this aspect, there is an advantage that image content (D1) can be generated more easily.

Without limiting to the above aspects, various aspects (including modifications) of the content generation method according to the first exemplary embodiment and the second exemplary embodiment can be embodied by content generation system (10), a program, and a non-transitory recording medium in which the program is recorded.

The configurations according to the second to eleventh aspect are not essential to the content generation method, and can be omitted as appropriate.

The configuration according to the thirteenth aspect is not essential to the content projection method, and can be omitted as appropriate.

What is claimed is:

1. A content generation method for generating image content to be projected at a projection position in a real space by a projector, the content generation method comprising:
    a first acquisition process that acquires space information regarding a virtual space corresponding to the real space;
    a second acquisition process that acquires display position information regarding a display position corresponding to the projection position in the virtual space;
    a third acquisition process that acquires reference position information regarding a reference position in the virtual space;
    a display process that displays an object on a virtual projection surface including the display position in the virtual space based on the space information, the reference position information, and the display position information;

an arrangement process that arranges a virtual camera at the reference position in the virtual space, the virtual camera having an angle of view that is same as an angle of view of the projector; and a generation process that captures, by the virtual camera, an image including the object viewed from the reference position, and generates the captured image as the image content.

2. The content generation method according to claim 1, wherein the projection position is movable in the real space, and the second acquisition process includes acquiring the display position information regarding the display position that moves in the virtual space in accordance with movement of the projection position.

3. The content generation method according to claim 2, wherein the projector includes:
   a projection unit configured to emit light for projection of a projection image by using the image content;
   a mirror unit configured to reflect the light emitted from the projection unit; and
   a drive unit configured to move the projection position by driving the mirror unit to change an orientation of the mirror unit.

4. The content generation method according to claim 2, wherein the generation process includes changing an orientation of the object in the image content in accordance with the display position in the virtual space.

5. The content generation method according to claim 2, wherein the generation process includes generating, as a moving picture, the image that is viewed from the reference position and includes the object displayed at the display position that moves in the virtual space.

6. The content generation method according to claim 2, further comprising a control information generation process of generating control information of the projector for movement of the projection position in the real space, in synchronization with movement of the display position.

7. The content generation method according to claim 1, wherein the image content is an image of the object excluding a background of the object in the virtual space.

8. The content generation method according to claim 1, further comprising a provision process that provides an input support tool that is for allowing a user to input the display position information in the second acquisition process, wherein the input support tool presents at least the display position in the virtual space.

9. The content generation method according to claim 8, wherein the input support tool presents the display position by displaying an image of the virtual space including the object displayed at the display position.

10. The content generation method according to claim 8, wherein the input support tool displays, as a reference screen, a rendered image of the object viewed from the reference position when the object is displayed at the display position in the virtual space.

11. The content generation method according to claim 1, wherein in the virtual space, a guide range is defined, the guide range serving as a guide of a range where the object is able to be displayed.

12. A content projection method comprising a projection process of projecting the image content generated by the content generation method according to claim 1, at the projection position in the real space by the projector.

13. The content projection method according to claim 12, further comprising a correction process of correcting at least one of an installation state of the projector or control information of the projector, in accordance with a parameter used in the generation process.

14. A non-transitory computer readable medium storing a program for causing one or more processors to execute the content generation method according to claim 1.

15. A content generation system for generating image content to be projected at a projection position in a real space by a projector, the content generation system comprising:

a first acquisition unit configured to acquire space information regarding a virtual space corresponding to the real space;

a second acquisition unit configured to acquire display position information regarding a display position corresponding to the projection position in the virtual space;

a third acquisition unit configured to acquire reference position information regarding a reference position in the virtual space; and a generation unit configured to:
   display an object on a virtual projection surface including the display position in the virtual space based on the space information, the reference position information, and the display position information;
   arrange a virtual camera at the reference position in the virtual space, the virtual camera having an angle of view that is same as an angle of view of the projector; and
   capture, by the virtual camera, an image including the object viewed from the reference position, and generate the captured image as the image content.

* * * * *